(12) United States Patent
Fukushima et al.

(10) Patent No.: US 7,533,602 B2
(45) Date of Patent: May 19, 2009

(54) BEVERAGE MANUFACTURING APPARATUS

(75) Inventors: Naoto Fukushima, Tatebayashi (JP); Mamoru Ittetsu, Ashikaga (JP); Hiroshi Yamamoto, Gyouda (JP); Shigeru Togashi, Ota (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 729 days.

(21) Appl. No.: 11/068,390

(22) Filed: Mar. 1, 2005

(65) Prior Publication Data
US 2005/0193890 A1 Sep. 8, 2005

(30) Foreign Application Priority Data
Mar. 3, 2004 (JP) .............. 2004-059268

(51) Int. Cl.
A47J 31/00 (2006.01)
(52) U.S. Cl. .............. 99/286; 99/287; 99/299
(58) Field of Classification Search ........... 99/286, 99/287, 285, 299
See application file for complete search history.

(56) References Cited

U.S. PATENT DOCUMENTS

| 4,779,520 | A | * | 10/1988 | Hauslein ............... 99/287 |
| 5,387,256 | A | * | 2/1995 | Enomoto ............... 99/286 |
| 5,511,465 | A | * | 4/1996 | Friedrich et al. ......... 99/286 |
| 5,676,041 | A | * | 10/1997 | Glucksman et al. ....... 99/286 |
| 5,845,561 | A | * | 12/1998 | Chigira et al. .......... 99/286 |
| 5,858,437 | A | * | 1/1999 | Anson ................. 426/431 |
| 6,526,872 | B2 | * | 3/2003 | Wong ................. 99/282 |
| 6,612,224 | B2 | * | 9/2003 | Mercier et al. .......... 99/282 |
| 6,922,908 | B1 | * | 8/2005 | Raudales .............. 34/93 |
| 2002/0078831 | A1 | * | 6/2002 | Cai .................. 99/295 |
| 2002/0121197 | A1 | | 9/2002 | Mercier et al. ......... 99/279 |

FOREIGN PATENT DOCUMENTS

| GB | 945608 | 1/1964 |
| JP | 59-103628 | 6/1984 |
| JP | 61-249417 | 11/1986 |
| JP | 2-130087 | 10/1990 |
| JP | 5-137653 | 6/1993 |
| JP | 5-63420 | 8/1993 |
| JP | 05-253067 | 10/1993 |
| JP | 08-280538 | 10/1996 |
| JP | 11-221153 | 8/1999 |
| JP | 2000-219296 | 8/2000 |
| JP | 2001-061665 | 3/2001 |
| JP | 2001-275837 | 10/2001 |
| JP | 2002-193262 | 7/2002 |
| JP | 2004-118680 | 4/2004 |
| JP | 2004-514487 | 5/2004 |

* cited by examiner

*Primary Examiner*—Reginald L Alexander
(74) *Attorney, Agent, or Firm*—Kratz, Quintos & Hanson, LLP

(57) ABSTRACT

For a purpose of providing a beverage manufacturing apparatus capable of quickly serving high-quality tea beverage which suits user's palate and enhancing versatility, the beverage manufacturing apparatus comprises: a tea mill for crushing leaf tea to produce crushed leaf tea; a hot water tank unit for producing hot water; an extraction container for extracting tea beverage using the crushed leaf tea and the hot water; and a microcomputer for controlling supply of the crushed leaf tea from the tea mill to the extraction container and supply of the hot water from the hot water tank unit to the extraction container based on arbitrary setting, and the extraction unit is capable of being charged with a dripper and a paper filter.

7 Claims, 16 Drawing Sheets

BEVERAGE MANUFACTURING APPARATUS

BACKGROUND OF THE INVENTION

The present invention relates to a beverage manufacturing apparatus which extracts tea beverage using leaf tea.

In Japan, taste, aroma, flavor of tea beverage have heretofore been valued. The taste, aroma, and flavor of the tea beverage are largely influenced by an amount of leaf tea such as green tea of medium quality, temperature·amount extracting hot water, soaking time, that is, a way of making tea. Therefore, sufficient attentions and cares need to be taken in extracting fragrant tea beverage.

On the other hand, in recent years, a tea beverage manufacturing machine for extracting tea beverage from hot water and leaf tea has been developed. In this tea beverage manufacturing machine, predetermined amounts of hot water and leaf tea are fed to an extraction machine, the leaf tea is steamed in the extraction machine for a predetermined time, tea beverage is extracted with high concentration, and the extracted tea beverage is kept to be warm in a heating cabinet. Moreover, when a user or a provider, that is, a person who uses the tea beverage manufacturing machine performs a predetermined operation, a predetermined amount of high-concentration tea beverage is supplied in a cup together with hot water for dilution from the heating cabinet (see, e.g., Japanese Patent Application Laid-Open No. 11-197023).

However, in the above-described tea beverage manufacturing machine, extracted tea beverage is pooled until it is served to the user. Therefore, there has been a problem that the taste, aroma, flavor, and color are degraded with an elapse of time. Then, the tea beverage is extracted without pooling the predetermined amount every time the beverage is served. In this case, a time of about one or two minutes is required for sufficiently extracting the tea beverage from the leaf tea, and therefore there occurs a problem that the serving to the user delays.

Above all, the tea beverage manufacturing machine has such a system that the high-concentration tea beverage is extracted, kept warm, diluted, and served. Therefore, it has been remarkably difficult to realize the taste, aroma, and flavor of the tea beverage with high quality, which is to be recommended to the user by a server in accordance with user's request.

SUMMARY OF THE INVENTION

The present invention has been developed to solve such conventional technical problem, and an object is to provide a beverage manufacturing apparatus capable of quickly serving high-quality tea beverage which suits user's (server's or utilizer's) palate.

Another object of the present invention is to enhance versatility of the beverage manufacturing apparatus.

That is, according to the present invention, there is provided a beverage manufacturing apparatus comprising: crushing means for crushing leaf tea to produce crushed leaf tea; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting, the extraction means being capable of being charged with a dripper and a paper filter, the control means being capable of supplying the only hot water from the hot water supply means to the extraction means from a hot water supply port.

Moreover, in the beverage manufacturing apparatus of the present invention, a shower head is attachable to the hot water supply port.

Furthermore, in the beverage manufacturing apparatus of the present invention, the extraction means comprises a discharge mechanism which discharges the beverage in the extraction means by a predetermined operation.

Additionally, in the beverage manufacturing apparatus of the present invention, the invention further comprises discharge means for discharging the beverage in the extraction means, and the control means controls the discharge of the tea beverage from the extraction means by the discharge means.

Moreover, in the beverage manufacturing apparatus of the present invention, the invention comprises stirring means for stirring the beverage extracted by the extraction means, and the stirring means is changeably disposed.

Furthermore, in the beverage manufacturing apparatus of the present invention, the control means controls a stirring speed of the stirring means based on arbitrary setting.

Additionally, in the beverage manufacturing apparatus of the present invention, the extraction means is detachably attached, and the control means comprises means for detecting attachment of the extraction means, and prohibits a supply operation and/or a stirring operation in a case where the extraction means is not attached.

Moreover, according to the present invention, there is provided a beverage manufacturing apparatus comprising: crushing means for crushing leaf tea to produce crushed leaf tea; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting, the extraction means being detachably attached, the control means comprising means for detecting attachment of the extraction means, and prohibiting a supply operation in a case where the extraction means is not attached.

Furthermore, according to the present invention, there is provided a beverage manufacturing apparatus comprising: crushing means for crushing leaf tea to produce crushed leaf tea; hot water supply means for producing hot water; extraction means for extracting tea beverage using the crushed leaf tea and the hot water; discharge means for discharging the beverage in the extraction means; stirring means for stirring the beverage extracted by the extraction means; and control means for controlling supply of the crushed leaf tea from the crushing means to the extraction means, supply of the hot water from the hot water supply means to the extraction means, and the stirring means based on arbitrary setting, the control means being capable of intermittently operating the stirring means, the extraction means being detachably attached to a predetermined resistance imparting member.

Additionally, according to the present invention, there is provided a beverage manufacturing apparatus comprising: crushing means for crushing leaf tea to produce crushed leaf tea; leaf tea containing means for containing the leaf tea crushed by the crushing means; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting, the leaf tea containing means comprising a holding portion which detachably holds a dehumidifying agent or a drying agent.

Moreover, in the beverage manufacturing apparatus of the present invention, the hot water supply means comprises high-temperature water producing means for producing high-temperature hot water, and low-temperature water producing means for producing comparatively low temperature hot water, and the control means supplies the hot water to the extraction means from the high-temperature water producing means or the low-temperature water producing means based on the arbitrary setting.

Furthermore, in the beverage manufacturing apparatus of the present invention, the hot water once set at high temperature is cooled and supplied to the low-temperature water producing means by the high-temperature water producing means.

Furthermore, in the beverage manufacturing apparatus of the present invention, the invention further comprises a communication tube which supplies the hot water to the low-temperature water producing means from the high-temperature water producing means, and the communication tube is wound in a coil shape.

Additionally, in the beverage manufacturing apparatus of the present invention, the invention comprises a fan which passes air through the communication tube.

Moreover, in the beverage manufacturing apparatus of the present invention, the invention comprises a temperature sensor which detects the temperature of the communication tube, and the control means operates a fan in a case where the temperature of the communication tube reaches a predetermined temperature or more.

Furthermore, in the beverage manufacturing apparatus of the present invention, the communication tube is disposed in a duct, and the air is passed through the duct by the fan.

Additionally, in the beverage manufacturing apparatus of the present invention, the invention comprises a wind direction inhibiting member disposed in a center portion of a coil of the communication tube.

Moreover, in the beverage manufacturing apparatus of the present invention, heat is exchanged between a water supply tube and the communication tube with respect to the hot water supply means.

DESCRIPTION OF THE PREFERRED EMBODIMENT

Figure 1:
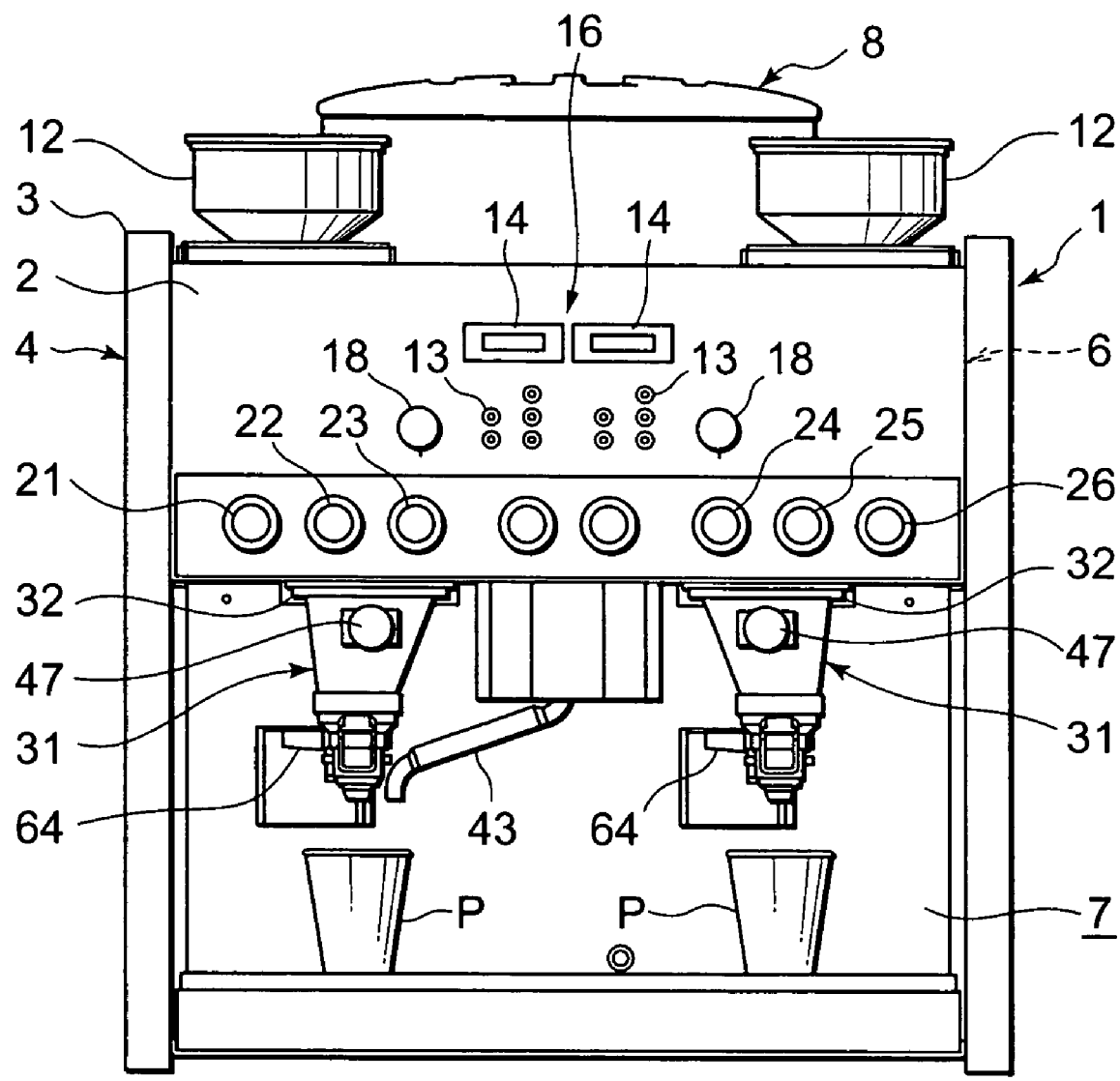
FIG. 1 is a front view of a beverage manufacturing apparatus according to an embodiment to which the present invention is applied.
Figure 2:
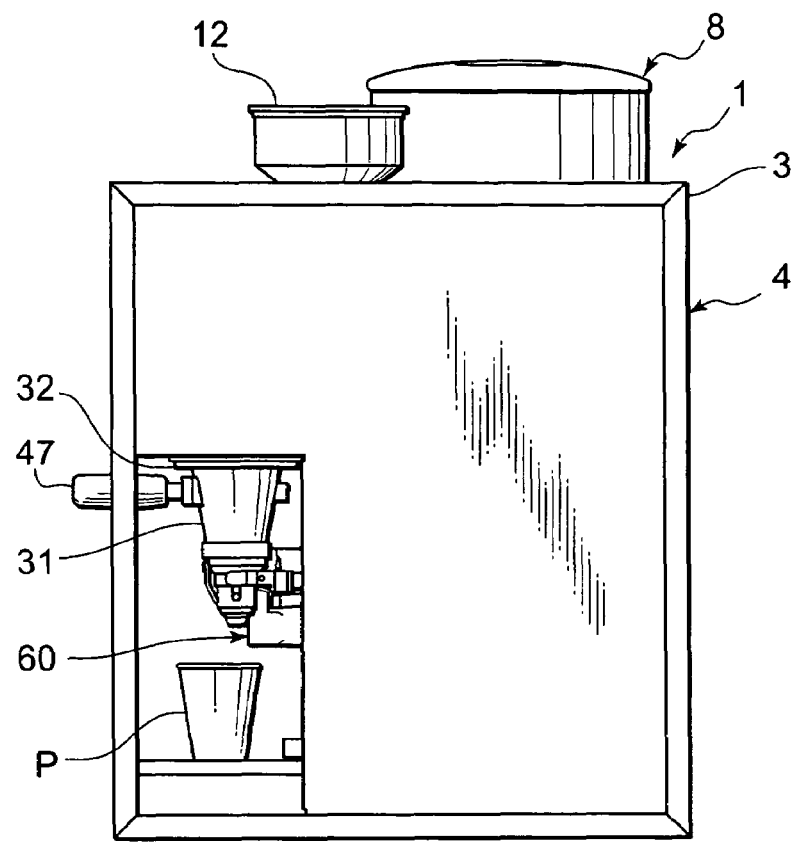
FIG. 2 is a side view of the beverage manufacturing apparatus of FIG. 1.
Figure 3:
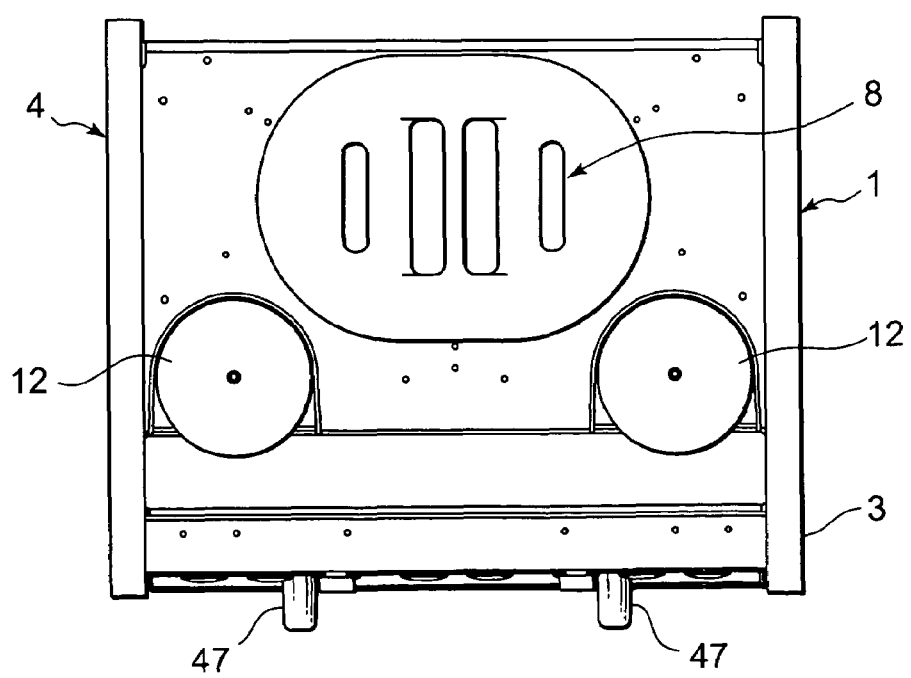
FIG. 3 is a plan view of the beverage manufacturing apparatus of FIG. 1.

Next, an embodiment of the present invention will be described with reference to the drawings. It is to be noted that a beverage manufacturing apparatus 1 of the embodiment is used for extracting and serving tea beverage cup by cup, and examples of tea beverage to which the apparatus is applicable include not only Japanese tea (green tea: medium-quality tea·powdered green tea) which is a main application but also black tea and Chinese tea.

In the beverage manufacturing apparatus 1 of the embodiment, a main body 4 comprises a rectangular case 3, a unit chamber 6 is constituted extending to a rear part from an upper part of this main body 4, and a front-face panel 2 openably closes an upper front face of the unit chamber 6. Moreover, a tea supply chamber 7 opened forwards is constituted under the unit chamber 6 of the upper part. A hot water tank unit 8 constituting hot water supply means is attached to a top surface middle rear portion of the main body 4.

A constitution and operation of the hot water tank unit 8 will be described with reference to FIGS. 22 to 26. The hot water tank unit 8 comprises: a high-temperature tank 71 constituting high-temperature water producing means; a low-temperature tank 72 constituting low-temperature water producing means; electric heaters 73, 74 which heats the respective tanks; floats 76, 77 for detecting water levels; hot water temperature sensors 78, 79 which detect temperatures of the respective tanks; take-out valves (electromagnetic valves) 81, 82 which take out high-temperature and low-temperature hot water from the respective tanks; an upper limit switch 83 and a lower limit switch 84 for detecting upper and lower limit water levels in the high-temperature tank 71 by the float 76; a lower limit switch 86 for detecting the lower limit water level in the low-temperature tank 72 by the float 77; a water supply valve (electromagnetic valve) 88 for supplying city water to the high-temperature tank 71 from a water supply tube 87; a communication tube 89 which connects a substantially upper limit water level position of the high-temperature tank 71 to a lower part of the low-temperature tank 72 and which is disposed in such a manner as to exchange heat with the water supply tube 87; a fan 91 which passes air to this communication tube 89; and a temperature sensor 92 which detects the temperature of the communication tube 89. These units constituting the hot water tank unit 8 are controlled by a microcomputer 66 (FIG. 27) which is control means described later.

Figure 23:
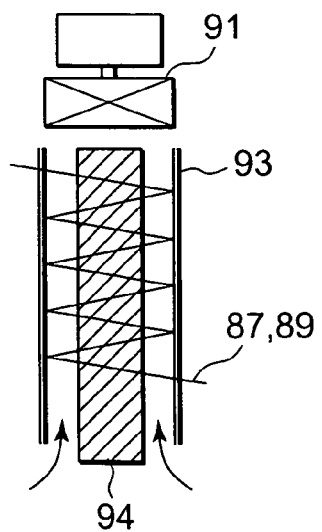
FIG. 23 is a sectional view of a duct portion of the hot water tank unit of FIG. 22.

The water supply tube 87 is attached to the communication tube 89, wound in a coil shape, and disposed in a peripheral portion inside a cylindrical duct 93. A wind direction inhibiting member 94 is inserted in a central portion of the coiled water supply tube 87 and communication tube 89, and the fan 91 is constituted in such a manner as to pass air into this duct 93 (FIG. 23).

Figure 24:
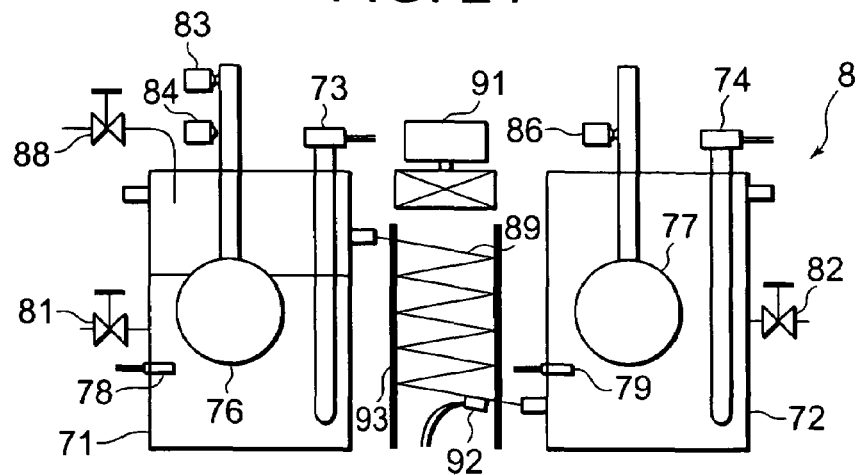
FIG. 24 is an explanatory view of a hot water producing operation of the hot water tank unit of FIG. 22.
Figure 25:
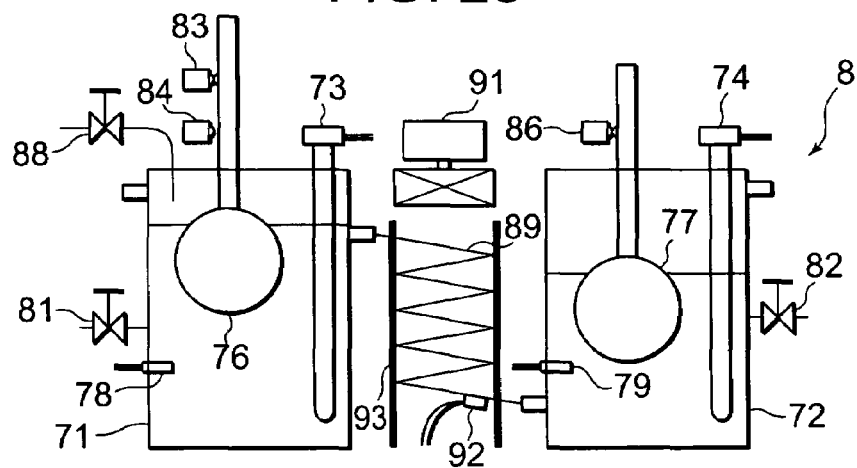
FIG. 25 is an explanatory view of the hot water producing operation of the hot water tank unit of FIG. 22.
Figure 26:
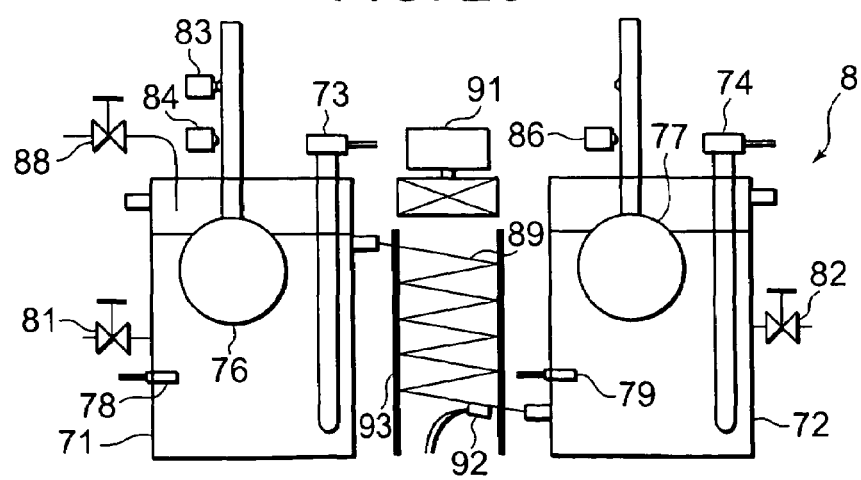
FIG. 26 is similarly an explanatory view of the hot water producing operation of the hot water tank unit of FIG. 22.

Next, a producing operation of hot water in the hot water tank unit 8 controlled by the microcomputer 66 described later will be described. It is now assumed that both the tanks 71, 72 are empty. When operation is started, the microcomputer 66 opens the water supply valve 88 to thereby supply the city water to the high-temperature tank 71 from the water supply tube 87 (FIG. 24). Moreover, when the water level rises, and the float 76 operates the lower limit switch 84, power conduction is started with respect to the electric heater 73. Moreover, after elapse of a predetermined time after the float 76 operates the lower limit switch 84, once the water supply valve 88 closes, and water in the high-temperature tank 71 is boiled, for example, at 98° C. or more. The temperature is detected by the hot water temperature sensor 78. Furthermore, after the water is boiled, the water supply valve 88 is opened again, a predetermined amount of water is supplied, and thereafter the valve is closed. After the temperature drops by the water supply, and the water is boiled again, an operation of opening the water supply valve 88 is repeated, and high-temperature hot water is produced and pooled. Thereafter, the power conduction to the electric heater 73 is controlled at the temperature of the hot water in the high-temperature tank 71 detected by the hot water temperature sensor 78, and the temperature of the hot water in the high-temperature tank 71 is maintained, for example, at +98° C.

By the water supply from the water supply tube 87, the water level of the high-temperature hot water (high-temperature water) in the high-temperature tank 71 rises. When approaching a position of a substantially upper limit water level, the hot water in the high-temperature tank 71 flows into the communication tube 89, passes through the communication tube 89, flows into the low-temperature tank 72 by positional energy, and is supplied. This communication tube 89 is disposed in such a manner as to exchange heat with the water supply tube 87 through which normal-temperature city water circulates. The microcomputer 66 operates the fan 91 to thereby pass the air in a case where the temperature detected by the temperature sensor 92 is, for example, at +75° C. or more. Therefore, the hot water flowing downwards in the communication tube 89 receives both water cooling and air cooling, and is cooled. At this time, since the wind direction inhibiting member 94 is disposed inside the communication tube 89 in the duct 93, the air passed by the fan 91 flows and satisfactorily contacts the vicinity of the communication tube 89. Consequently, a cooling effect of the communication tube 89 is enhanced together with a funnel effect (rising air current) by the duct 93.

That is, since the cooled hot water once boiled and cooled in the high-temperature tank 71 is supplied into the low-temperature tank 72, chlorine smell of the city water is suppressed. Moreover, when the float 77 rises, and the water level rises to the lower limit switch 86, the power conduction to the electric heater 74 starts. When the power conduction to the electric heater 74 is controlled by the hot water temperature sensor 79, the hot water temperature in the low-temperature tank 72 is maintained, for example, attached to +65° C. which is a comparatively low for the hot water. The microcomputer 66 closes the water supply valve 88 based on the float 76 and the upper limit switch 83 at a time when the water level in the high-temperature tank 71 reaches the upper limit. It is to be noted that the water level in the low-temperature tank 72 is brought into the same position as that of the water level of the high-temperature tank 71 by Pascal's principle.

Thereafter, the high-temperature water is taken out of the high-temperature tank 71 by the take-out valve 81. When the water level drops below the upper limit switch 83, the microcomputer 66 opens the water supply valve 88 to thereby supply water. The low-temperature hot water in the low-temperature tank 72 is taken out by the take-out valve 82. When the water level drops, the hot water in the high-temperature tank 71 is cooled and replenished from the communication tube 89. Thus, the high-temperature hot water is produced and stored in the high-temperature tank 71, and the comparatively low-temperature hot water is produced and stored in the low-temperature tank 72.

A pair of leaf tea canisters (leaf tea containing means) 12, 12 are attached to top-surface right/left of the main body 4 on front right/left sides of the hot water tank unit 8. A predetermined amount of leaf tea such as medium-quality tea, highest-quality green tea, and mixture of them is contained, for example, in both the leaf tea canisters 12, 12. In a middle of the front-face panel 2, an operation section 16 is disposed comprising: a key switch 13 for performing input setting; and displays 14, 14 constituted of liquid crystals for displaying data and the like input by the key switch 13. Knobs 18, 18 for adjusting stirring speeds of stirring vanes (stirring means) 17 described later are disposed on the right/left sides of the front-face panel 2. Furthermore, vending buttons 21, 22, 23, and 24, 25, 26 to be selected and operated in extracting the tea beverage or supplying the hot water are arranged on lower end portion right/left sides of the front-face panel 2.

Figure 27:
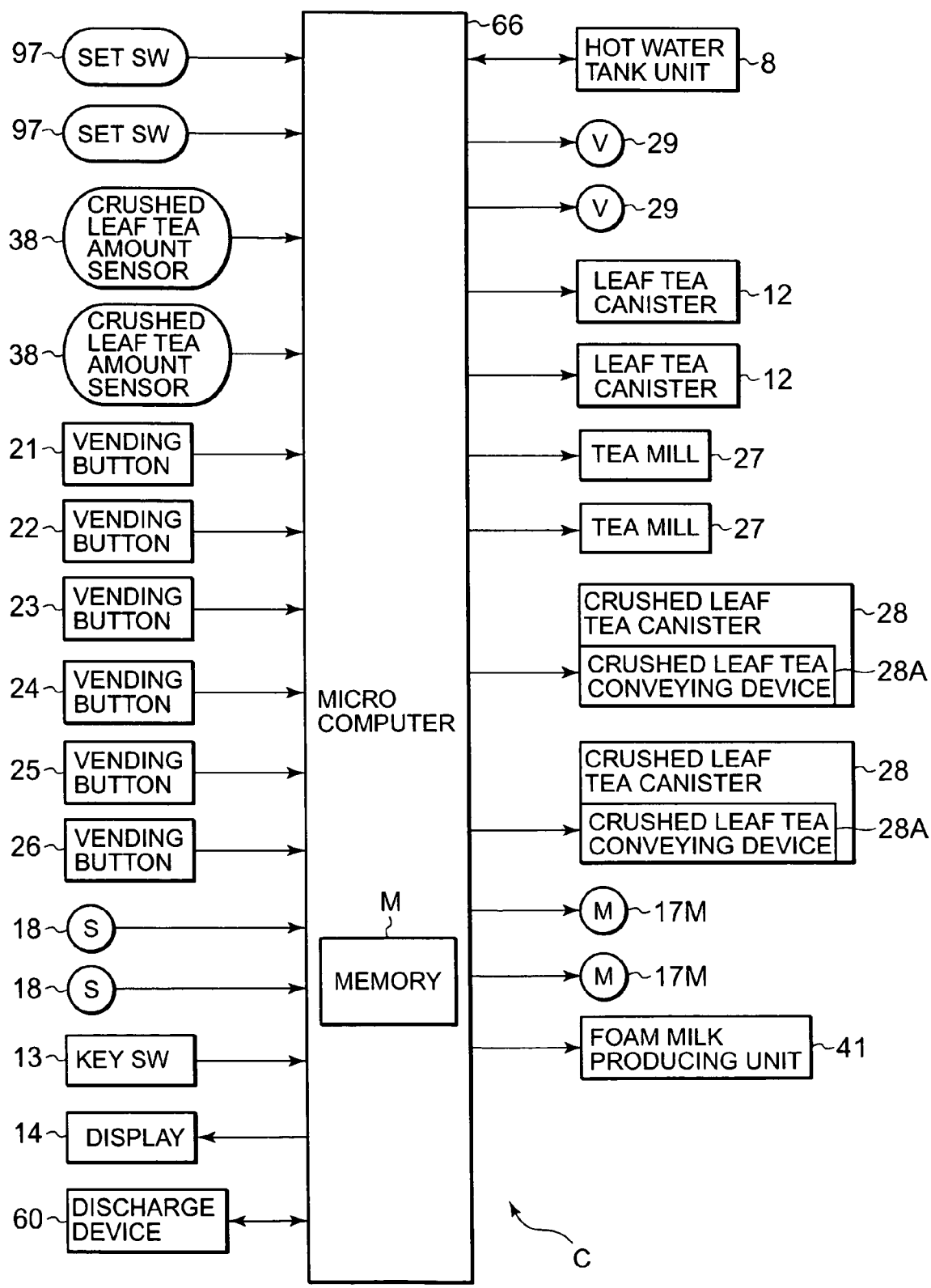
FIG. 27 is a block diagram of a control device of the beverage manufacturing apparatus of FIG. 1.

On the right/left sides in the unit chamber 6 which is the upper part of the main body 4, tea mills 27, 27 (shown in FIG. 27), crushed leaf tea canisters 28, 28 (these tea mills 27 and crushed leaf tea canisters 28 constitute crushing means, and are shown in FIG. 27), stirring motors 17M, 17M (shown in FIG. 27) constituted of brushless DC motors for rotating/driving the stirring vanes 17, 17, and hot water supply valves 29, 29 (shown in FIG. 27) are arranged. Moreover, the right/left tea mills 27, 27 correspond to lower sides of the right/left leaf tea canisters 12, 12, and the right/left crushed leaf tea canisters 28, 28 correspond to the insides of the right/left tea mills 27, 27.

Figure 21:
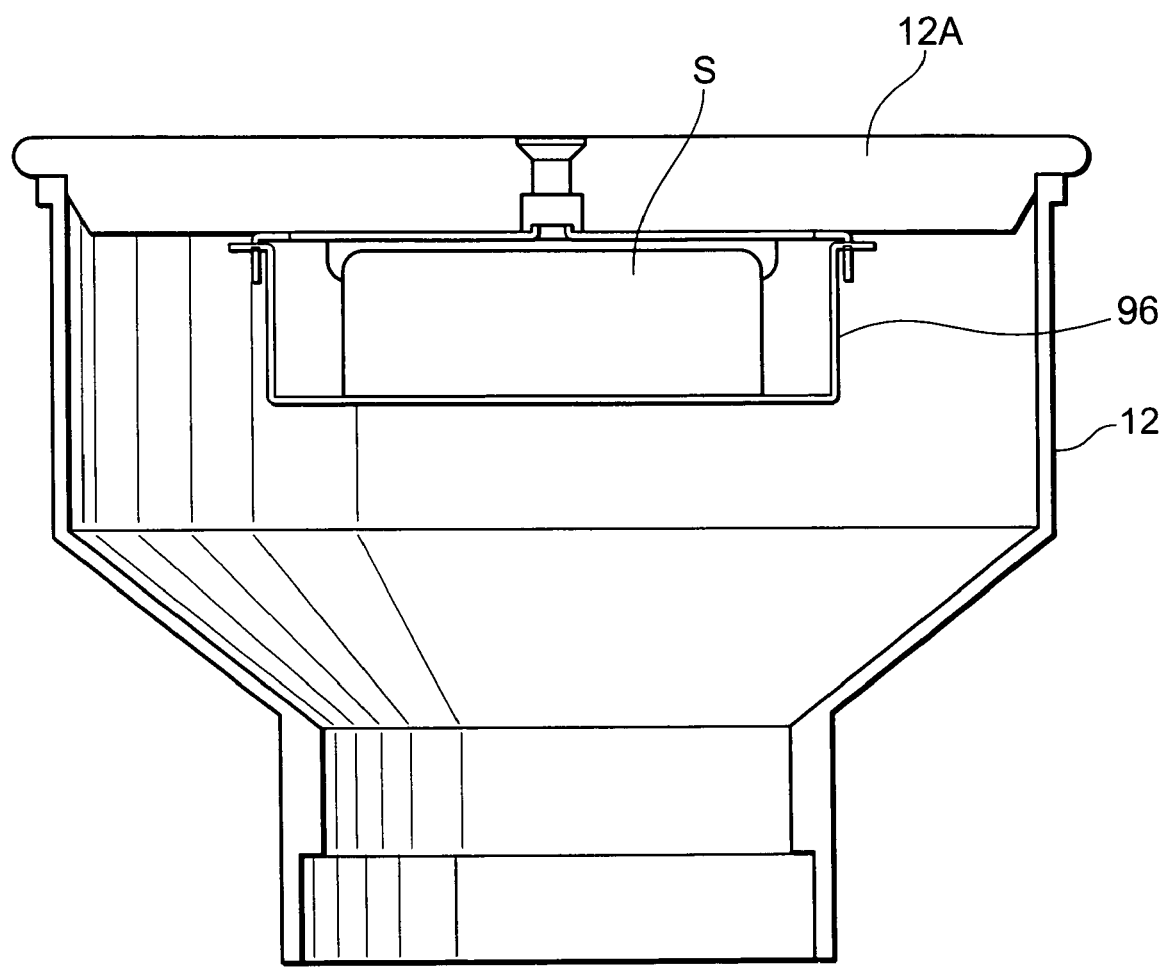
FIG. 21 is a sectional view of the beverage manufacturing apparatus and a leaf tea canister of FIG. 1.
Figure 22:
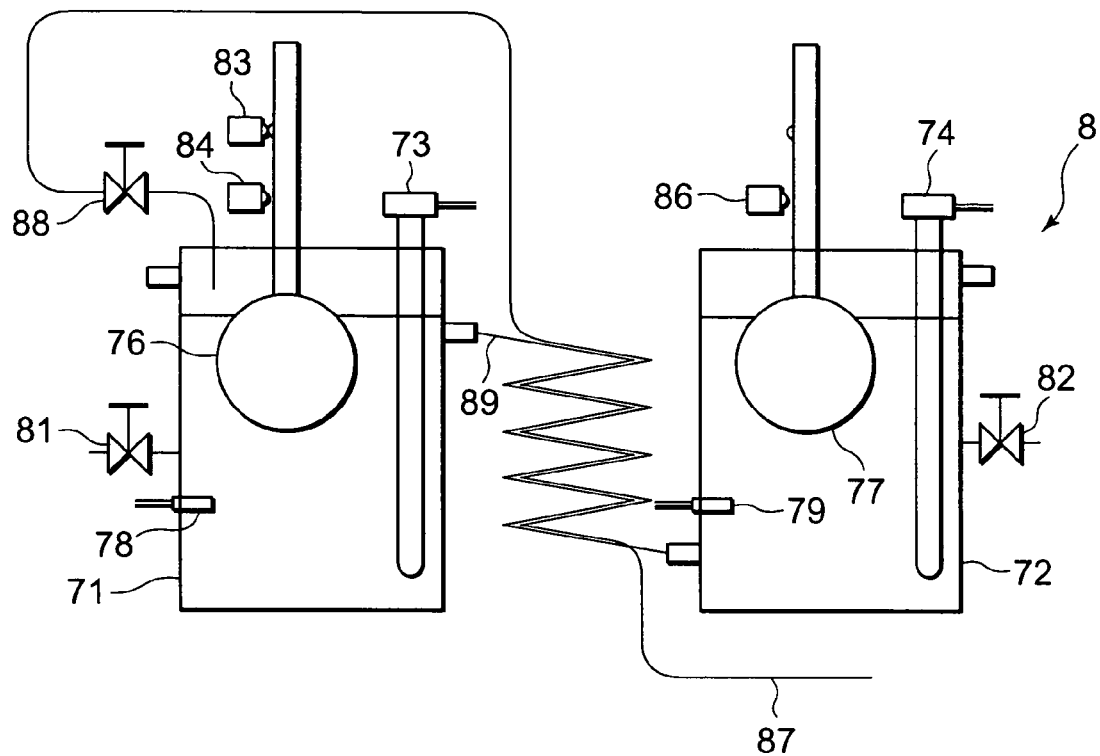
FIG. 22 is a constitution diagram of a hot water tank unit of FIG. 1.

It is to be noted that a breathable basket 96 is detachably attached to upper lids 12A, 12A of the respective leaf tea canisters 12, 12 as shown in FIG. 21. Moreover, a dehumidifying agent (or a drying agent) S is removably contained in the basket 96. When the dehumidifying agent S is attached to the inside of the leaf tea canister 12 in this manner, a disadvantage that the crushed leaf tea disposed inside soaks up moisture and degrades can be inhibited or prevented. Since the dehumidifying agent S is removably held, a changing or charging operation is also facilitated.

Moreover, annular attachment frames 32, 32 to which extraction containers (extraction means) 31, 31 are detachably attached are disposed on the right/left sides of the lower surface of the unit chamber 6 which is the upper part of the main body 4. The right/left stirring motors 17M, 17M and the right/left hot water supply valves 29, 29 correspond to upper parts inside the right/left attachment frames 32, 32.

The right/left tea mills 27, 27 are disposed facing the lower end portions of the right/left leaf tea canisters 12, 12, and the leaf tea drops directly into the respective tea mills 27, 27 from the leaf tea canisters 12, 12, and is supplied. The tea mills 27, 27 comprise cutting blades and grinder mills. After cutting the leaf tea supplied from the leaf tea canisters 12, 12, the tea is ground by the grinder mills to thereby produce crushed leaf tea having a predetermined particle diameter (about 30 microns. Here, usual powdered green tea has a particle diameter of about 10 microns). It is to be noted that crushed grain sizes of the leaf tea in the tea mills 27, 27 are adjustable, and the cutting blades are also changeable.

Moreover, the crushed leaf tea crushed by the right/left tea mills 27, 27 is projected and contained in the right/left crushed leaf tea canisters 28, 28. Crushed leaf tea conveying devices 28A, 28A (FIG. 27) constituted of spiral augers are disposed in the right/left crushed leaf tea canisters 28, 28, and crushed leaf tea is supplied into the right/left extraction containers 31, 31 from the right/left crushed leaf tea canisters 28, 28 by the respective crushed leaf tea conveying devices 28A, 28A. It is to be noted that crushed leaf tea amount sensors 38, 38 (FIG. 27) for detecting amounts of the crushed leaf tea disposed inside are arranged in the respective crushed leaf tea canisters 28, 28.

Moreover, a foam milk producing unit (foam milk producing means) 41 (FIG. 27) is disposed in the unit chamber 6 in the rear part of the main body 4. This foam milk producing unit 41 comprises a milker comprising a mixing portion, a steam boiler, milk bag (kept to be cold) and the like. The unit receives supply of high-temperature hot water from the high-temperature tank 71 of the hot water tank unit 8, heats the water by the steam boiler, generates steam, and supplies the steam to the milker. When this steam passes through the mixing portion of the milker, air in the atmosphere and milk in the milk bag are simultaneously sucked, mixed, foamed, and discharged from a foam milk nozzle 43. This foam milk nozzle 43 is disposed in such a manner as to be rotatable on the right/left sides in a lower surface middle of the unit chamber 6 in the upper part of the main body 4. The nozzle is capable of rotating and supplying the foam milk into cups P disposed facing predetermined tea supply positions below the right/left extraction containers (extraction means) 31, 31 in the tea supply chamber 7.

Figure 4:
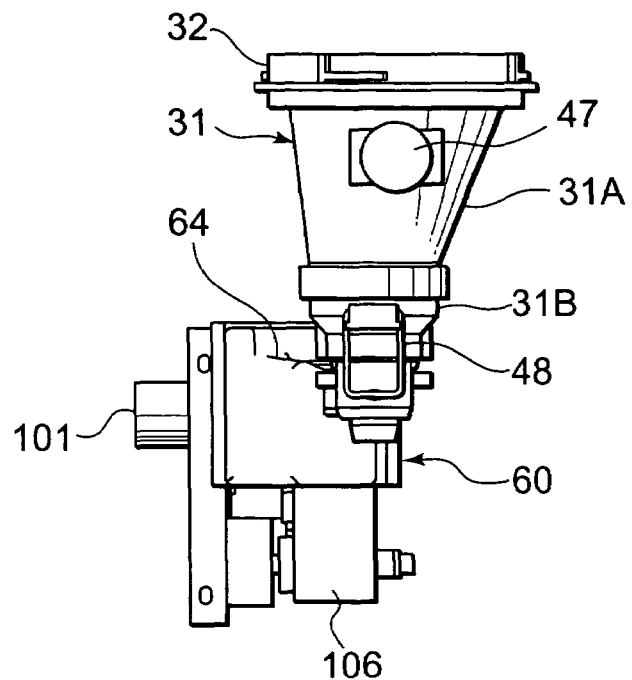
FIG. 4 is a front view of an extraction container and an attachment frame in a state in which the extraction container of the beverage manufacturing apparatus of FIG. 1 is attached to the attachment frame.
Figure 5:
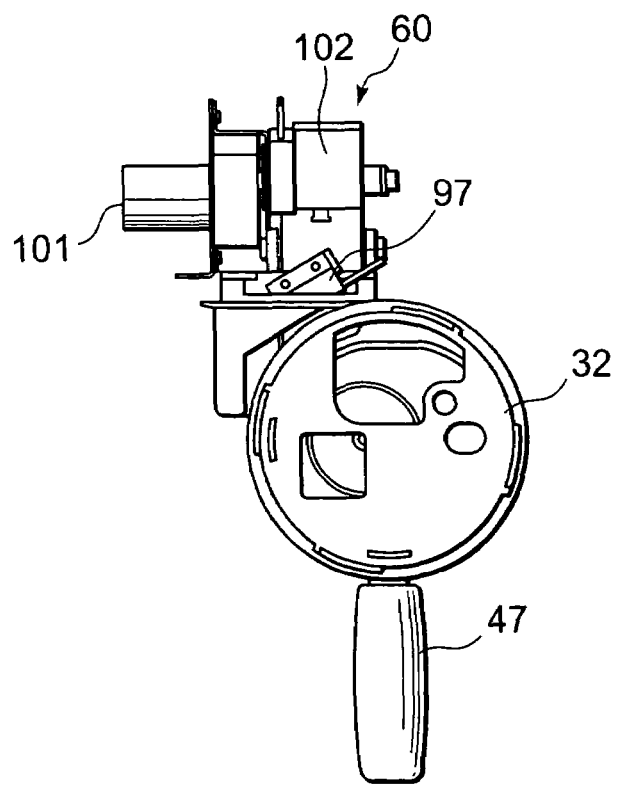
FIG. 5 is a plan view of the extraction container and the attachment frame of FIG. 4.
Figure 6:
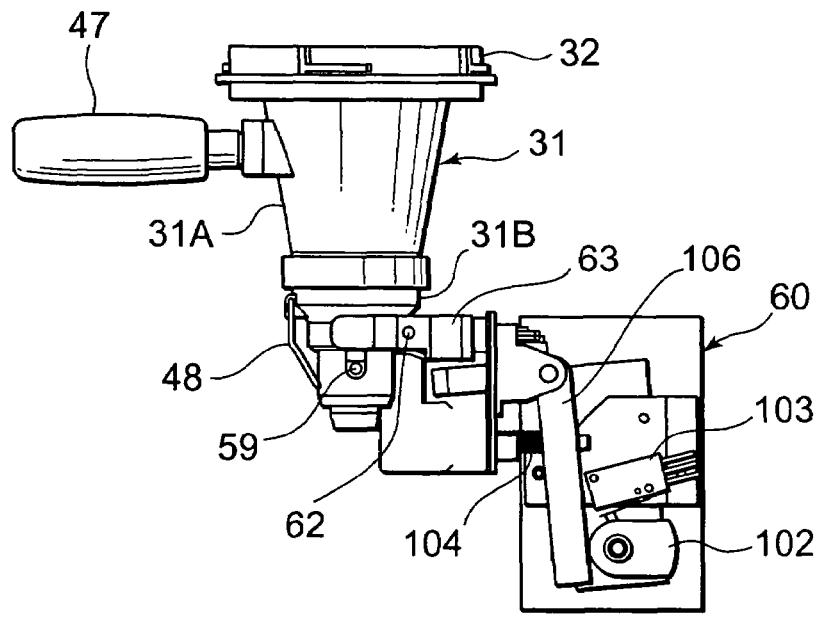
FIG. 6 is a side view of the extraction container and the attachment frame of FIG. 4.
Figure 7:
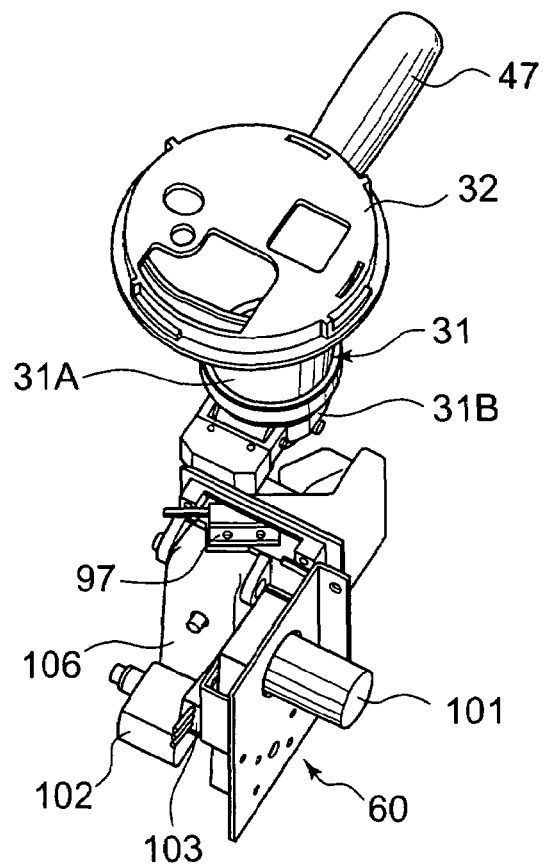
FIG. 7 is a perspective view of the extraction container and the attachment frame of FIG. 4.
Figure 8:
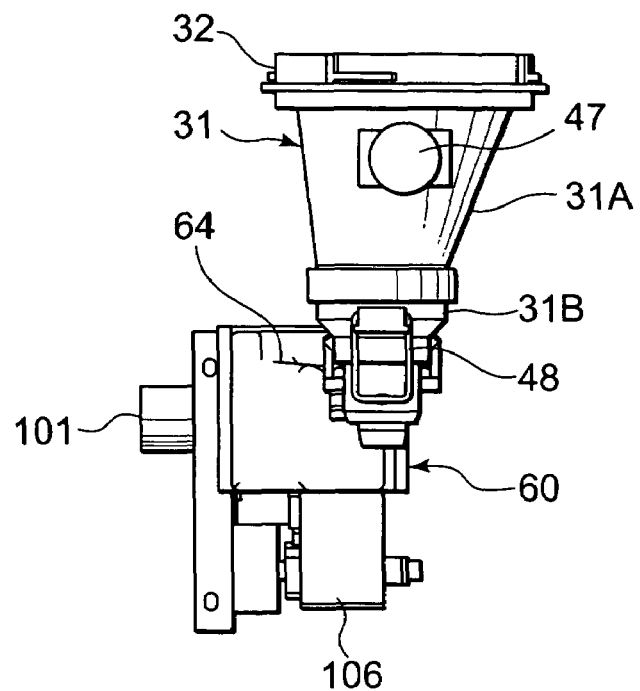
FIG. 8 is a front view of the extraction container and the attachment frame in a state in which the extraction container of the beverage manufacturing apparatus of FIG. 1 is attached to the attachment frame, and an extraction port is automatically opened by a discharge device.
Figure 9:
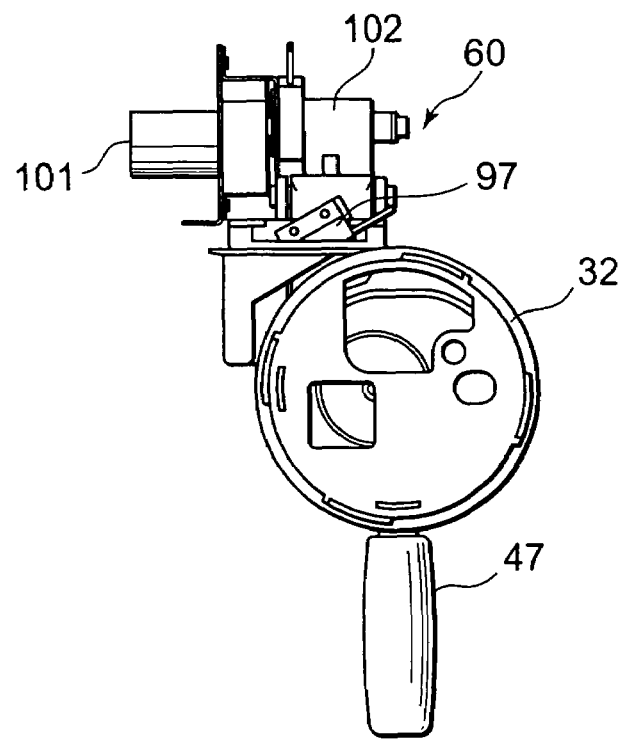
FIG. 9 is a plan view of the extraction container and the attachment frame of FIG. 8.
Figure 10:
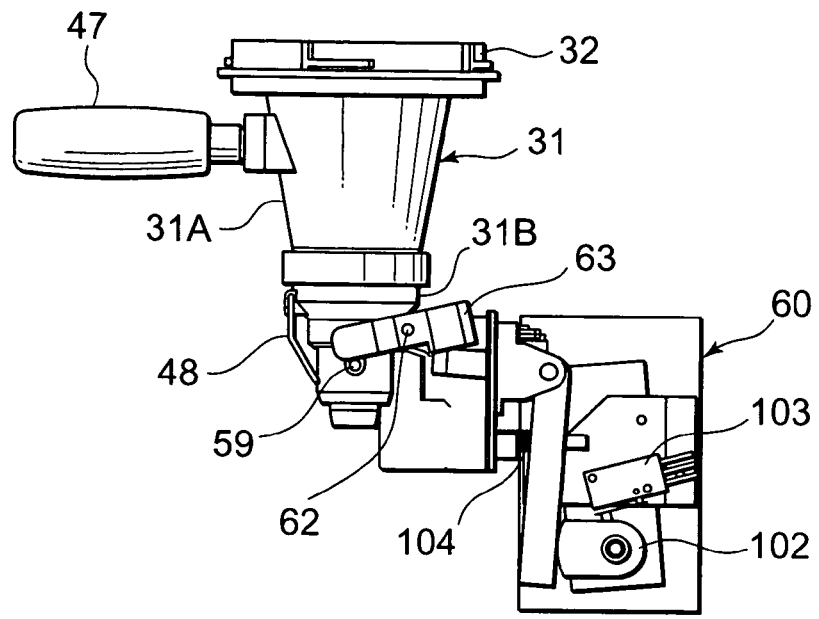
FIG. 10 is a side view of the extraction container and the attachment frame of FIG. 8.
Figure 11:
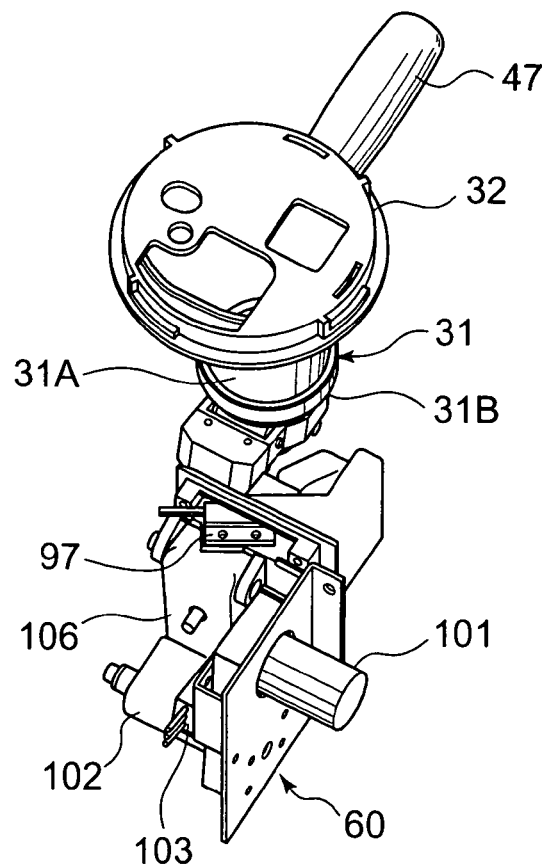
FIG. 11 is a perspective view of the extraction container and the attachment frame of FIG. 8.
Figure 12:
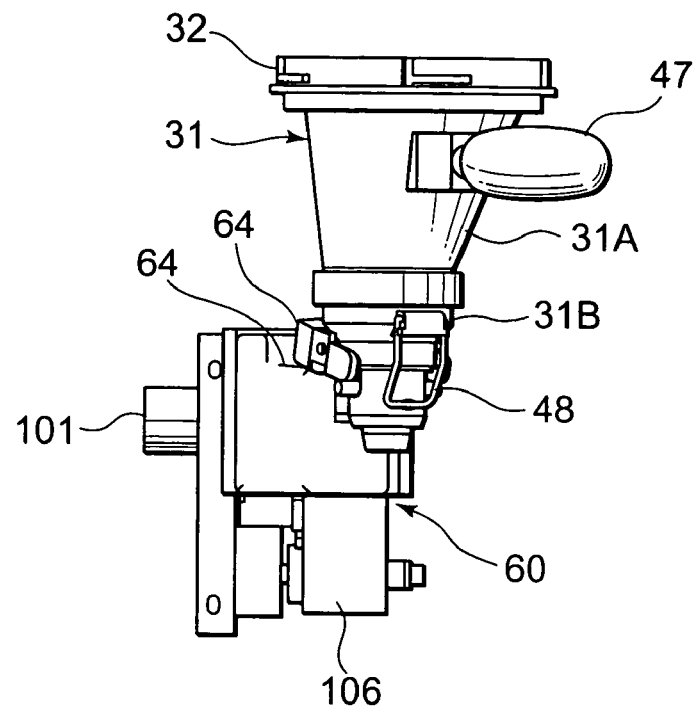
FIG. 12 is a front view of the extraction container and the attachment frame in a state in which the extraction container of the beverage manufacturing apparatus of FIG. 1 is attached to the attachment frame, and the extraction port is manually opened.
Figure 13:
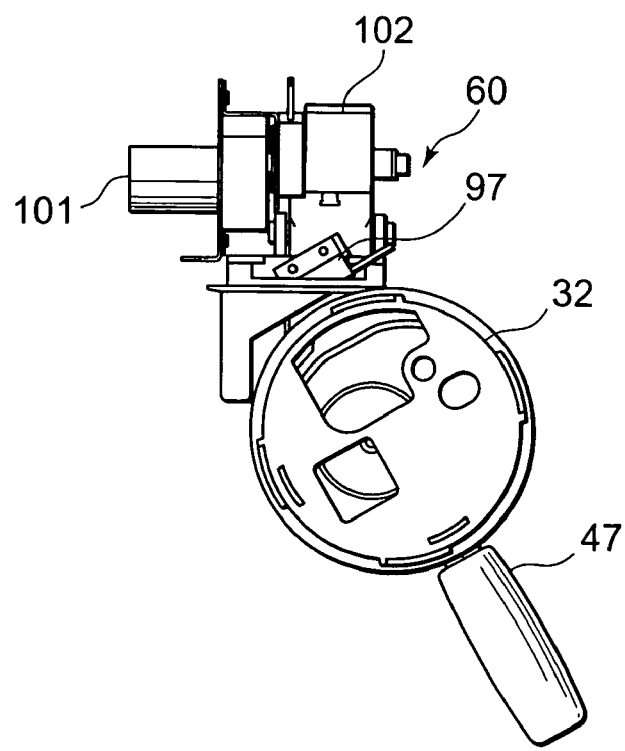
FIG. 13 is a plan view of the extraction container and the attachment frame of FIG. 12.
Figure 14:
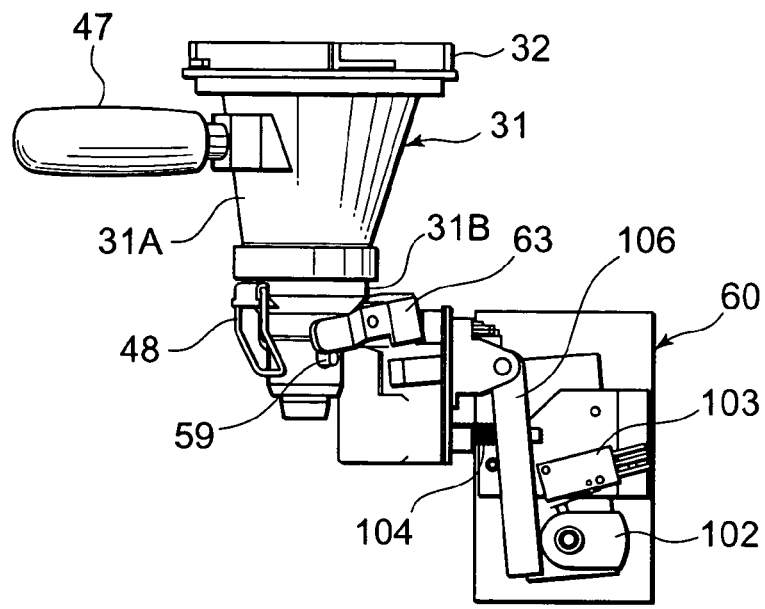
FIG. 14 is a side view of the extraction container and the attachment frame of FIG. 12.
Figure 15:
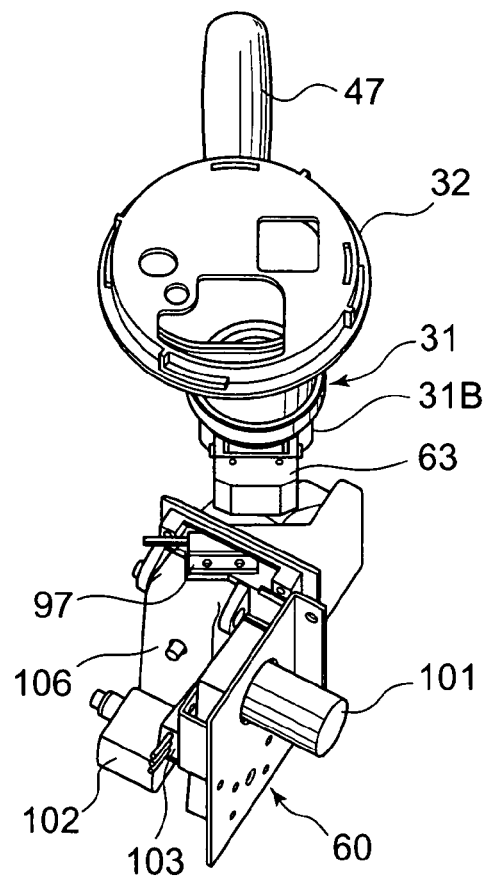
FIG. 15 is a perspective view of the extraction container and the attachment frame of FIG. 12.
Figure 16:
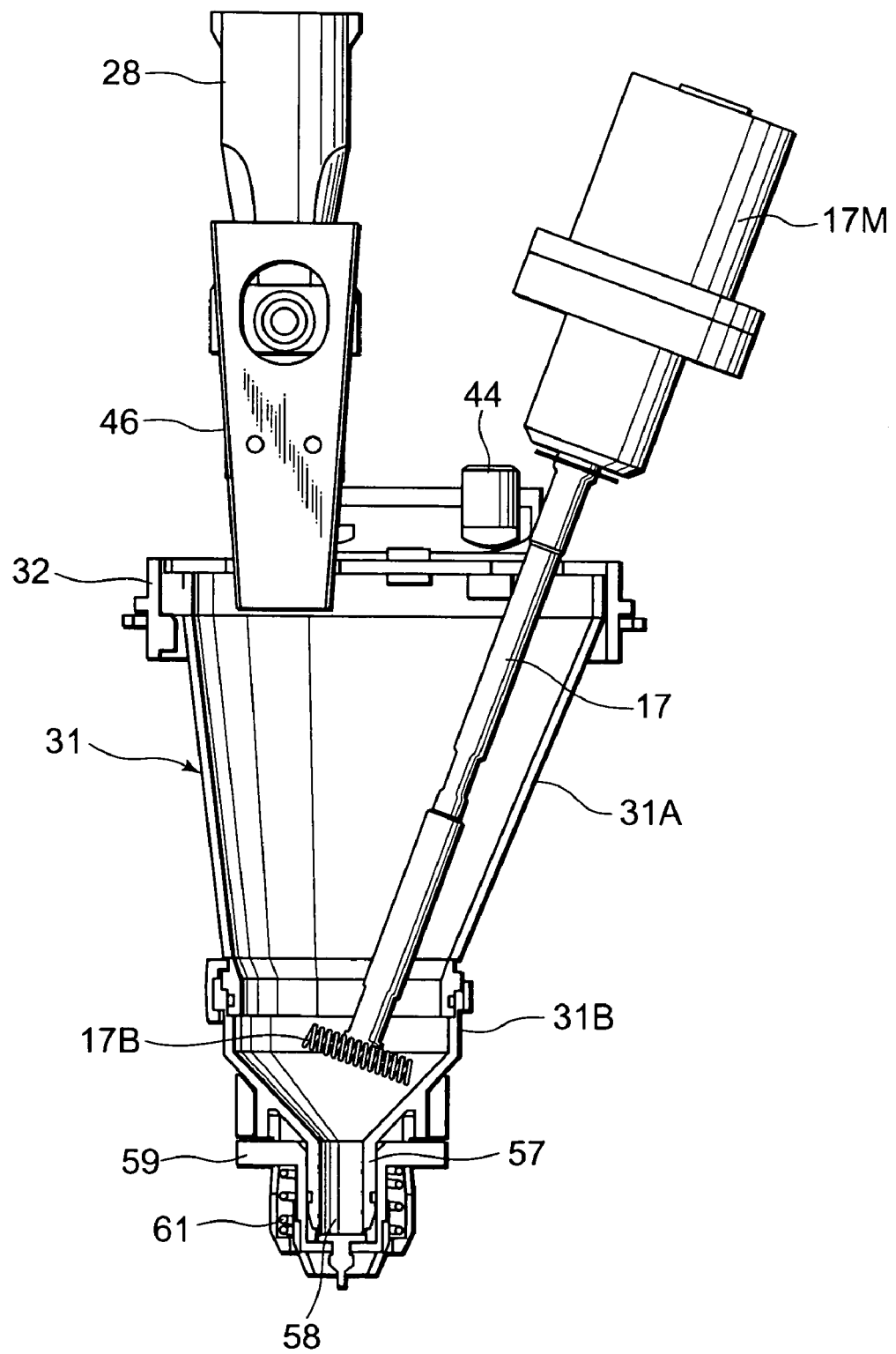
FIG. 16 is a sectional view showing that the extraction container is attached to the attachment frame of the beverage manufacturing apparatus of FIG. 1, and the extraction port is closed.

Next, FIG. 4 is a front view of the extraction container 31, the attachment frame 32 and the like on the left side of FIG. 1,
FIG. 5 is a plan view thereof, FIG. 6 is a side view thereof, FIG. 7 is a perspective view thereof, and FIG. 16 is a sectional view thereof. It is to be noted that the extraction container 31 and the attachment frame 32 on the left side only will be described hereinafter, and the extraction container 31 and the attachment frame 32 on the right side have similar basic structure (right/left symmetric). A hot water supply port 44 connected to a hot water pipe (not shown) from the left hot water supply valve 29 is constituted in the attachment frame 32 as shown in FIG. 16. The hot water from the high-temperature tank 71 or the low-temperature tank 72 of the hot water tank unit 8 is supplied into the extraction container 31 attached to the attachment frame 32 from the hot water supply port 44 via the respective take-out valves 81, 82 and the hot water supply valve 29 in a subsequent stage. A crushed tea leaf supply port 46 (chute) is disposed facing the upper side of the attachment frame 32, and the crushed leaf tea in the crushed leaf tea canister 28 is supplied into the extraction container 31 attached to the attachment frame 32 from the crushed leaf tea supply port 46 from the crushed leaf tea conveying device 28A.

On the other hand, the extraction container 31 comprises: an upper container 31A which has a predetermined capacity and vertically opens; a lever 47 attached to the side face of the upper container 31A; and a lower container 31B detachably connected to the lower side of the upper container 31A via a wire 48. The extraction container 31 is detachably attached to the attachment frame 32 using an engaging flange formed on the upper end side face of the upper container 31A. To attach this extraction container 31 to the attachment frame 32, the lever 47 is first in a position of about 30 degrees toward left front, an upper surface opening in the upper container 31A is aligned to the inside of the attachment frame 32, and the lever 47 is rotated counterclockwise as viewed from the above until the lever 47 reaches the front (FIGS. 4 to 7). Accordingly, the engaging flange engages with a groove inside the attachment frame 32 to thereby attach the extraction container 31.

Here, a permanent magnet (not shown) is attached to an operation arm 63 attached to the lower container 31B as described later. On the other hand, a set switch 97 (means for detecting attachment of the extraction means) constituted of a lead switch is attached to the main body 4 in a position facing the permanent magnet in a state in which the extraction container 31 is attached as shown in FIGS. 4 to 7. This set switch 97 closes a contact by a magnetic force of the permanent magnet. The microcomputer 66 described later detects that the extraction container 31 is attached to the attachment frame 32 in this contact state of this set switch 97. In a state in which the container is not attached, the microcomputer prohibits the supplying of the hot water, crushed leaf tea, and foam milk, and the stirring of the stirring vane 17 described later.

Figure 17:
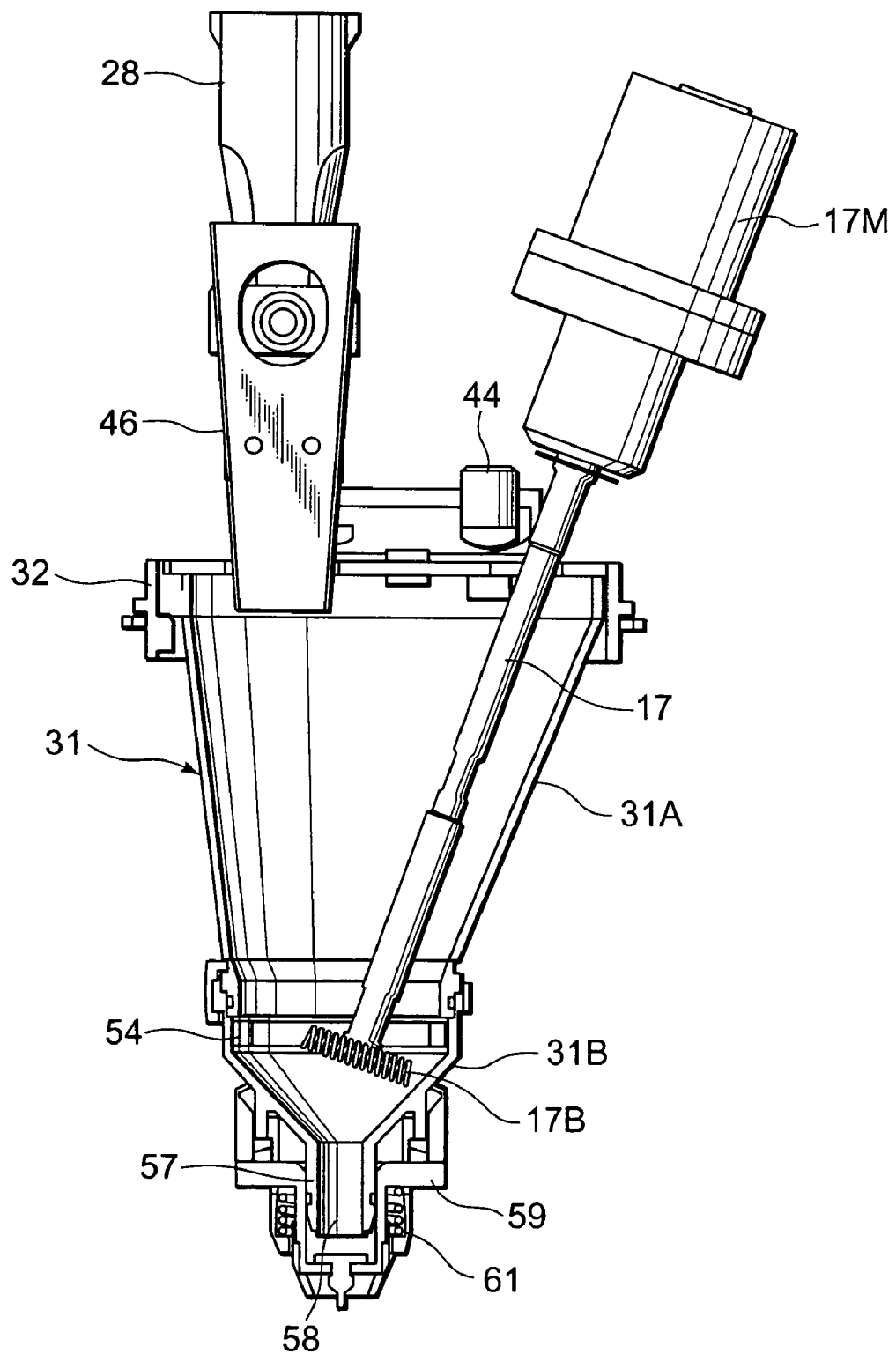
FIG. 17 is a sectional view showing a state in which the extraction container is attached to the attachment frame of the beverage manufacturing apparatus of FIG. 1, and the extraction port is opened.

Moreover, to detach the container, conversely, when the lever is rotated clockwise as viewed from above in the state of FIGS. 4 to 7, the engagement of the engaging flange is released, and accordingly the container can be detached. Thus, since the extraction container 31 is detachably attached to the attachment frame 32 on the main body 4 side, cleaning in the extraction container 31, and attaching·changing of a dripper 98 described later and a paper filter can be easily performed. On the other hand, a resistance imparting member 54 is attachable to the lower container 31B of the extraction container 31 as shown in FIG. 17. This resistance imparting member 54 imparts resistance to an eddy current of the hot water and crushed leaf tea stirred in the extraction container 31 to thereby improve foaming.

The stirring vane 17 is detachably attached to the stirring motor 17M, extends obliquely downward from the stirring motor 17M through the attachment frame 32 as shown in FIGS. 16, 17, and enters the extraction container 31 attached to the attachment frame 32 (the stirring motor 17M on the right side is similar). That is, the stirring vane 17 only remains on the attachment frame 32 (main body 4) side and protrudes downwards in a state in which the extraction container 31 is detached from the attachment frame 32.

The stirring vane 17 stirs the beverage extracted in the extraction container 31, and a stirring spring 17B (foaming unit shape) is attached to a tip of the vane. Since the stirring vane 17 is also detachably attached to the stirring motor 17M, the vane can be changed to a vane capable of obtaining a stirring effect suitable for beverage to be extracted, that is, tea beverage and coffee described later. It is to be noted that in the embodiment, the stirring vane 17 is a stirring vane for powdered green tea. In this case, the stirring vane 17 has such a size to extend into the lower container 31B of the extraction container 31. Consequently, the beverage is effectively foamed in a lower position.

Figure 18:
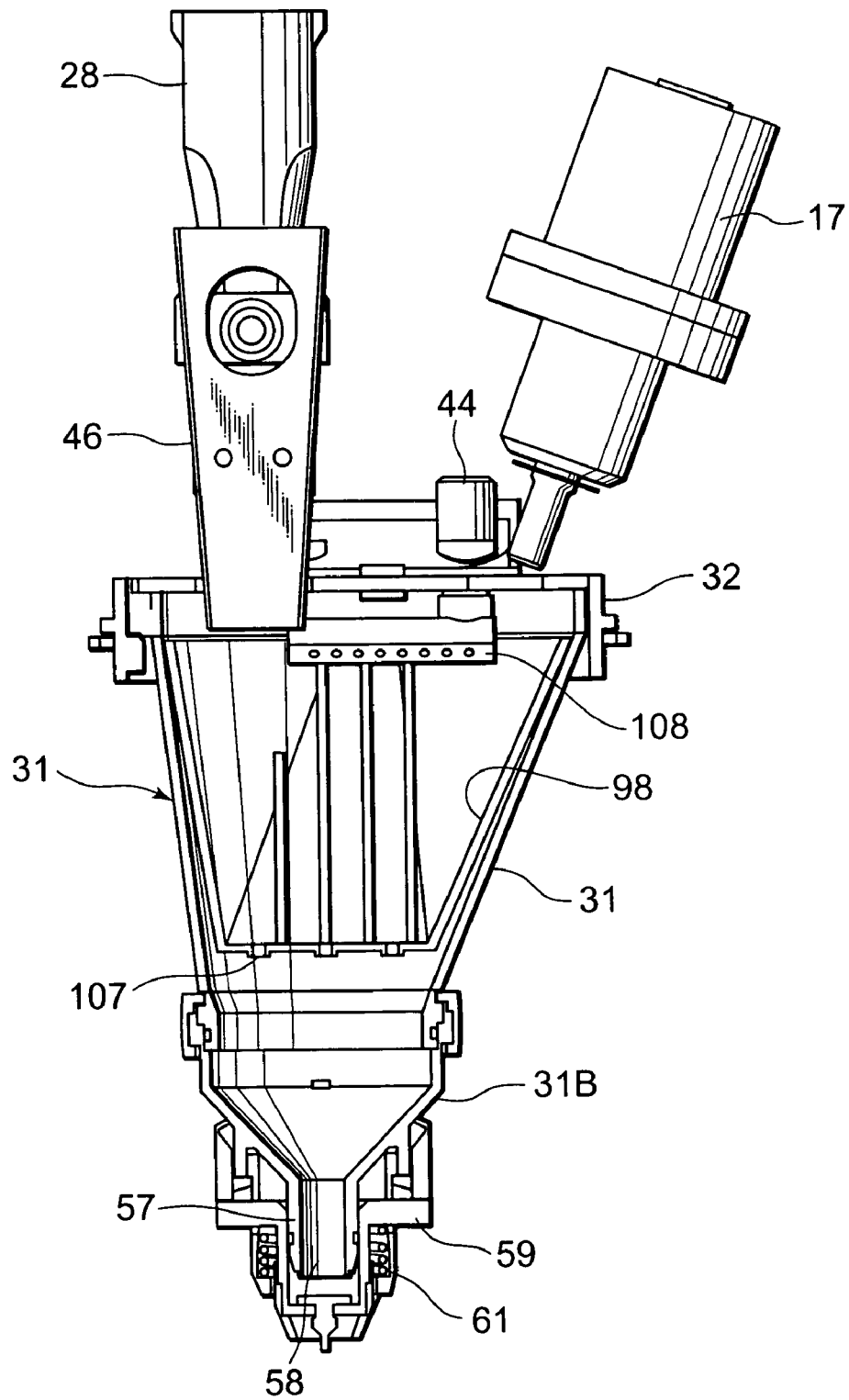
FIG. 18 is a sectional view showing a state in which a dripper is attached to the extraction container of the beverage manufacturing apparatus of FIG. 1, and the extraction container is attached to the attachment frame.
Figure 19:
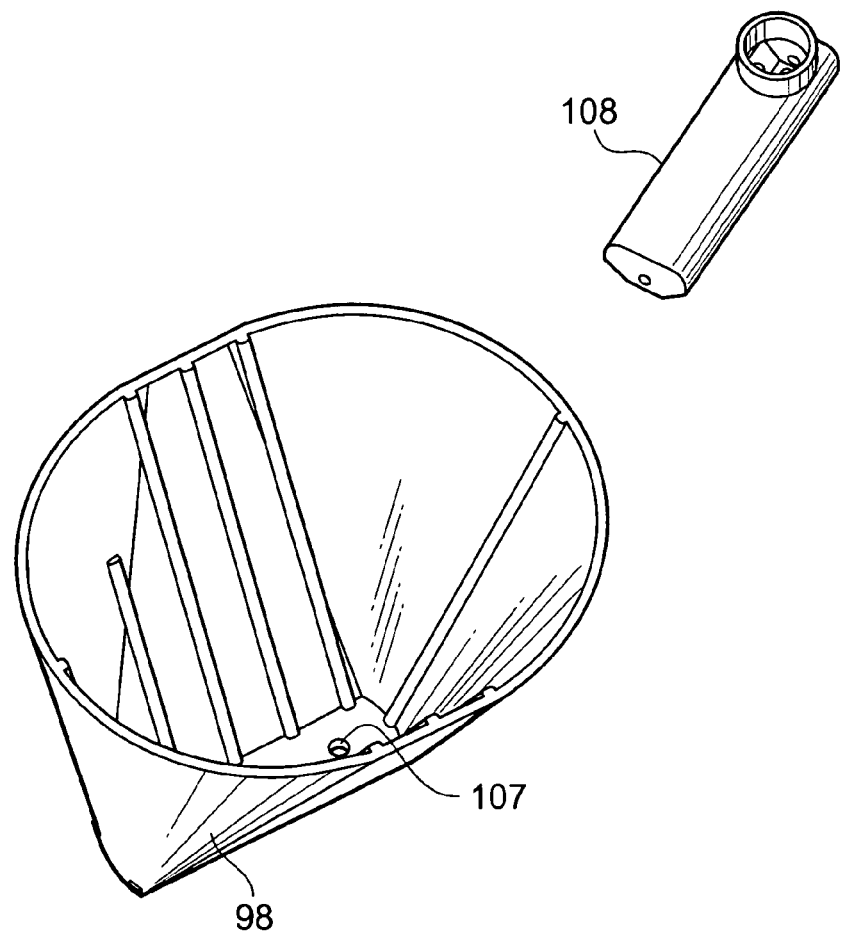
FIG. 19 is an upper perspective view of the dripper and a shower nozzle of FIG. 18.
Figure 20:
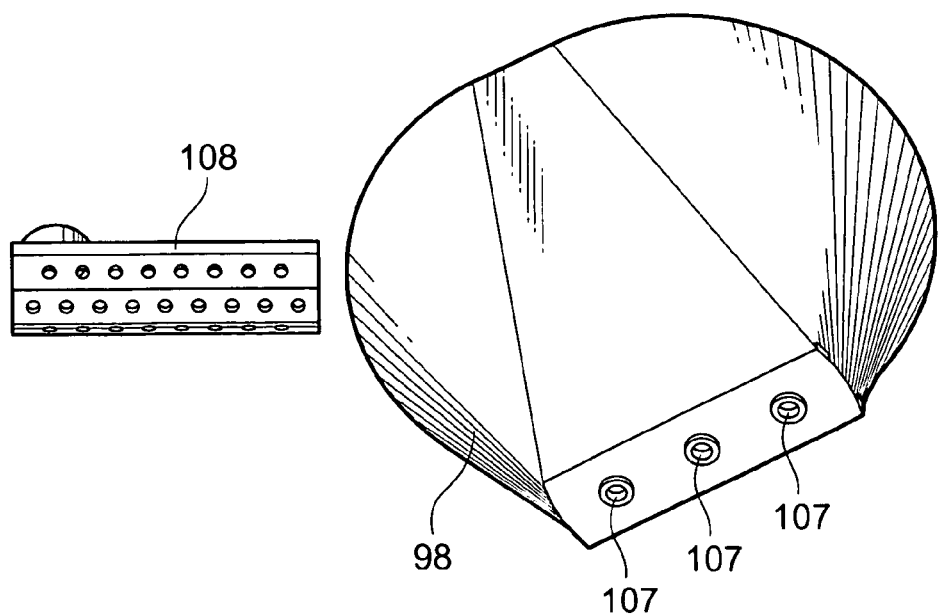
FIG. 20 is a lower perspective view of the dripper and the shower nozzle of FIG. 18.

Moreover, as shown in FIG. 18, the dripper 98 and paper filter (not shown) for extracting coffee are detachably attachable to the inside of the upper container 31A of the extraction container 31. As shown in FIGS. 19 and 20, the dripper 98 has a funnel shape as a whole, the upper surface thereof opens, a plurality of holes 107 . . . are formed in the lower end of the dripper, and a folded paper filter is inserted in the dripper. Moreover, a shower nozzle 108 is detachably attached to the hot water supply port 44. The shower nozzle 108 uniformly scatters the hot water supplied from the hot water supply port 44 over whole coffee material powder (described later) in the dripper 98.

It is to be noted that as not shown in FIG. 18, the stirring vane 17 can enter the dripper 98 even in a state in which the dripper 98 is attached. In this case, the stirring vane 17 suitable for the extraction of coffee is attached to the stirring motor 17M to thereby stir the coffee.

A lower part of the lower container 31B is formed into a funnel shape to thereby form a tapered portion 57, and an extraction port 58 is formed in the lower end (tip) of the tapered portion 57. A stopper member 59 is vertically movably attached to the periphery of the tapered portion 57. The stopper member 59 is constantly urged by a coil spring 61 in such a manner as to move upwards as shown in FIG. 16. The stopper member 59 seals the extraction port 58 in a state in which the member is positioned in the upper part.

The stopper member 59 interlocks with the operation arm 63 which is rotatable in a vertical direction centering on a shaft 62 outside the lower container 31B. When the tip of the operation arm 63 rises, the stopper member 59 is pulled down (compressed) against the coil spring 61 to thereby open the extraction port 58 in a structure shown in FIG. 17. Moreover, in the main body 4 behind each tea supplying position, inclined riding members 64, 64 are attached to positions facing the operation arms 63 of the extraction containers 31, 31 attached to the attachment frames 32, 32. By counterclockwise rotation as viewed from above the extraction container 31 of FIG. 5, the operation arm 63 rides on the riding member 64 as shown in FIGS. 12 to 15, and the tip of the member rises (the stopper member 59, coil spring 61, operation arm 63 and the like constitute a discharge mechanism). That is, when the extraction container 31 is rotated counterclockwise as viewed from above in the state of FIG. 5, the extraction port 58 can be manually opened.

Furthermore, discharge devices (discharge means) 60, 60 are disposed in the main body 4 behind the riding members 64, 64. This discharge device 60 comprises a discharge motor 101, a cam 102, an open/close position detection switch 103 for detecting a cam position, an opening/closing lever 106 and the like. The opening/closing lever 106 is rotatably attached, and an upper end of the lever is positioned below the operation arm 63. The lever is constantly urged in such a manner as to rotate counterclockwise by a spring 104 in FIG. 6. The discharge motor 101 is driven/controlled by the microcomputer 66 described later, the cam 102 is rotated by the discharge motor 101, and the lower part of the opening/closing lever 106 is pushed toward the left against the spring 104 in FIG. 6. When the opening/closing lever 106 is pushed toward the left by the cam 102 in FIG. 6, the opening/closing lever 106 rotates clockwise, and an upper end of the lever lifts up the tip of the operation arm 63 as shown in FIGS. 8 to 11. That is, the microcomputer 66 is capable of controlling the discharge device 60 to automatically open the extraction port 58. By this constitution, a total process from the extraction to the discharge of the beverage can be automated.

Next, in FIG. 27, a control device C comprises the microcomputer 66 for general purpose, and an output of the microcomputer 66 is connected to the hot water tank unit 8, hot water supply valves 29, 29, tea mills 27, 27, crushed leaf tea conveying devices 28A, 28A, stirring motors 17M, 17M, foam milk producing unit 41, display 14 and the like. Input of the microcomputer 66 is connected to the set switches 97, 97, crushed leaf tea amount sensors 38, 38, vending buttons 21 to 26, stirring speed adjustment knobs 18, 18, key switch 13 and the like.

Data concerning an amount of hot water (high or low temperature) for each of the vending buttons 21 to 26, amount and presence of the crushed leaf tea, and presence of the foam milk can be set using the key switch 13 in a memory M of the microcomputer 66. For example, in the embodiment, the vending button 26 relates to powdered green tea (much foam), the vending button 22 relates to powdered green tea (little foam), the vending button 23 relates to medium-quality green tea (much foam), the vending button 24 relates to medium-quality green tea (little foam), the vending button 25 relates to green tea milk, and the vending button 21 relates to high-temperature water only. In this case, while seeing the display 14, the key switch 13 is used, then "much crushed leaf tea, low-temperature water, intermittent stirring" is set to the vending button 26, "much crushed leaf tea, low-temperature water, continuous stirring" is set to the vending button 22, "little crushed leaf tea, high-temperature water, intermittent stirring" is set to the vending button 23, "little crushed leaf tea, high-temperature water, continuous stirring" is set to the vending button 24, "much crushed leaf tea, low-temperature water, with foam milk" is set to the vending button 25, and "high-temperature water" is set to the vending button 21.

It is to be noted that the hot water amount and the crushed leaf tea amount in each setting are capable of being arbitrarily set using the key switch 13 and the display 14 in accordance with experience and palate by a user (server or utilizer of tea beverage). Moreover, the microcomputer 66 stores the set data corresponding to the respective vending buttons 21 to 26 in the memory M. When the vending buttons 21 to 26 are operated, the microcomputer controls the hot water tank unit 8, hot water supply valve 29, crushed leaf tea conveying devices 28A, 28A, foam milk producing unit 41, and stirring motor 17M. By the amounts set in accordance with the corresponding vending button, the hot water, crushed leaf tea, and foam milk are supplied into the respective extraction containers 31, 31, and the stirring vane 17 is rotated continuously or intermittently as set.

Moreover, an operation of the discharge device 60 can be set with the key switch 13. In this case, for example, the extraction port 58 is automatically opened by the discharge device 60 from start of hot water supply, or the port is closed at a hot water supply start time, and the extraction port 58 is set in such a manner as to automatically open after elapse of a predetermined time (arbitrarily settable). Accordingly, it is possible to automatically control extraction system or extraction time of the beverage.

An operation of the beverage manufacturing apparatus 1 constituted as described above in the present invention will be described. The extraction containers 31, 31 are attached to the right/left attachment frames 32, 32. Moreover, when power is turned on, the beverage manufacturing apparatus 1 produces and stores the high-temperature hot water and low-temperature hot water in the high-temperature tank 71 and the low-temperature tank 72 of the hot water tank unit 8 as described above.

Moreover, the tea mills 27, 27 are driven, and the leaf tea dropping from the respective leaf tea canisters 12, 12 is crushed by the respective tea mills 27, 27 as described above. The crushed leaf tea produced by the respective tea mills 27, 27 are contained in the crushed leaf tea canisters 28, 28. When the crushed leaf tea amount sensors 38, 38 detect a predetermined amount (upper limit value) of the crushed leaf tea, the driving of the corresponding tea mill 27 is stopped.

It is to be noted that as described later, in a case where the crushed leaf tea is taken out of the crushed leaf tea canisters 28, 28, and the crushed leaf tea amount drops to a lower limit value, the microcomputer 66 drives the tea mills 27, 27 again, and replenishes the crushed leaf tea in the crushed leaf tea canisters 28, 28 based on outputs of the crushed leaf tea amount sensors 38, 38. Moreover, when the predetermined amount (upper limit value) is similarly replenished, the tea mills 27, 27 are stopped. Here, a switch for driving the crushed leaf tea conveying device 28A of the crushed leaf tea canisters 28, 28 may be separately disposed, so that the only crushed leaf tea in the crushed leaf tea canister 28 can be supplied for topping or the like of soft ice cream. The predetermined amount (upper limit value) in the crushed leaf tea canister 28 is set to be as small as possible. Consequently, a disadvantage that the crushed leaf tea is left in the crushed leaf tea canister 28 for a long time and freshness drops is avoided. Moreover, when this preparation of the hot water and crushed leaf tea is completed, the selling is possible.

(1) Selling of Green Tea (Much or Little Foam)

First, to sell green tea (much foam), the cup P is set to the tea supply position below the right extraction container 31, and the vending button 26 is operated. Based on data concerning the vending button 26 set in the memory M, the microcomputer 66 controls the take-out valve 82 and the right hot water supply valve 29 of the hot water tank unit 8 to supply the low-temperature hot water from the low-temperature tank 72 into the extraction container 31, and controls the crushed leaf tea conveying device 28A of the right crushed leaf tea canister 28 to supply a large amount of crushed leaf tea into the extraction container 31 from the crushed leaf tea canister 28. At this time, the extraction port 58 is opened (automatically or manually) beforehand as shown in FIG. 17. Furthermore, the resistance imparting member 54 is set beforehand.

An extract content from the supplied crushed leaf tea oozes out to the hot water in the extraction container 31. At this time, since the leaf tea is crushed, a contact area with the hot water also increases. Therefore, the extract content quickly oozes out. Especially, with a large amount of crushed leaf tea and low-temperature hot water, very potent tea beverage (green tea) is produced in the extraction container 31. The microcomputer 66 intermittently operates the right stirring motor 17M, intermittently rotates the stirring vane 17, and stirs the hot water (tea beverage) in the extraction container 31. At this time, the extraction port 58 opens, intermittent stirring is performed, the resistance imparting member 54 is also set, and therefore a large amount of foam is generated in the tea beverage in the extraction container 31. Here, when the crushed leaf tea is formed into super or extreme particulates, the particulates and water molecules (hot water) are homogenized, water (hot water) is not separated from the crushed leaf tea, and mellow liquid state is obtained. By this constitution, all nutritional elements of the tea can be taken in as food. Moreover, much foamed extracted green tea is poured into the cup P from the extraction port 58.

Next, to sell powdered green tea (little foam), the cup P is set to the tea supply position below the left extraction container 31, and the vending button 22 is operated. Based on data concerning the vending button 22 set in the memory M, the microcomputer 66 controls the take-out valve 82 and the left hot water supply valve 29 of the hot water tank unit 8 to supply the low-temperature hot water from the low-temperature tank 72 into the extraction container 31, and controls the crushed leaf tea conveying device 28A of the left crushed leaf tea canister 28 to supply a large amount of crushed leaf tea into the extraction container 31 from the crushed leaf tea canister 28. At this time, the extraction port 58 is closed (automatically or manually) beforehand as shown in FIG. 16.

An extract content from the supplied crushed leaf tea oozes out to the hot water in the extraction container 31. At this time, since the leaf tea is crushed, a contact area with the hot water also increases. Therefore, the extract content quickly oozes out. Especially, with a large amount of crushed leaf tea and low-temperature hot water, very potent tea beverage (powdered green tea) is produced in the extraction container 31. The microcomputer 66 continuously operates the left stirring motor 17M, continuously rotates the stirring vane 17, and stirs the hot water (tea beverage) in the extraction container 31. At this time, the extraction port 58 closes, the stirring vane 17 also continuously stirs, therefore generated foam breaks, and the foaming is inhibited.

Moreover, after performing extraction and foaming for an arbitrary (or automatically set) time, the extraction port 58 is opened manually (or automatically) as described above. Accordingly, the tea beverage (powdered green tea) in the extraction container 31 is poured into the cup P below from the extraction port 58.

(2) Selling of Medium-Quality Green Tea (Much or Little Foam)

Next, to sell medium-quality green tea (much foam), the cup P is set to the tea supply position below the left extraction container 31, and the vending button 23 is operated. Based on data concerning the vending button 23 set in the memory M, the microcomputer 66 controls the take-out valve 81 and the left hot water supply valve 29 of the hot water tank unit 8 to supply the high-temperature hot water from the high-temperature tank 71 into the extraction container 31, and controls the crushed leaf tea conveying device 28A of the left crushed leaf tea canister 28 to supply a small amount of crushed leaf tea into the extraction container 31 from the crushed leaf tea canister 28. At this time, the extraction port 58 is opened (automatically or manually) beforehand as shown in FIG. 17. Furthermore, the resistance imparting member 54 is set beforehand.

An extract content from the supplied crushed leaf tea oozes out to the hot water in the extraction container 31. At this time, since the leaf tea is crushed, the extract content similarly quickly oozes out. In this case, with a small amount of crushed leaf tea and high-temperature hot water, medium potent tea beverage for the medium-quality green tea is extracted. The microcomputer 66 intermittently operates the left stirring motor 17M, intermittently rotates the stirring vane 17, and stirs the hot water (tea beverage) in the extraction container 31. At this time, the extraction port 58 opens, intermittent stirring is performed, the resistance imparting member 54 is also set, and therefore a large amount of foam is generated in the tea beverage in the extraction container 31. Moreover, the extracted much-foaming medium-quality green tea is poured into the cup P from the extraction port 58.

Next, to sell the medium-quality green tea (little foam), the cup P is set to the tea supply position below the right extraction container 31, and the vending button 24 is operated. Based on data concerning the vending button 24 set in the memory M, the microcomputer 66 controls the take-out valve 81 and the right hot water supply valve 29 of the hot water tank unit 8 to supply the high-temperature hot water from the high-temperature tank 71 into the extraction container 31, and controls the crushed leaf tea conveying device 28A of the right crushed leaf tea canister 28 to supply a small amount of crushed leaf tea into the extraction container 31 from the crushed leaf tea canister 28. At this time, the extraction port 58 is closed (automatically or manually) beforehand as shown in FIG. 16.

An extract content from the supplied crushed leaf tea oozes out to the hot water in the extraction container 31. At this time, since the leaf tea is crushed, the extract content similarly quickly oozes out. In this case, with a small amount of crushed leaf tea and high-temperature hot water, potent tea beverage suitable for the medium-quality green tea is extracted. The microcomputer 66 continuously operates the right stirring motor 17M, continuously rotates the stirring vane 17, and stirs the hot water (tea beverage) in the extraction container 31. At this time, the extraction port 58 closes, the stirring vane 17 also continuously stirs, therefore generated foam breaks, and the foaming is inhibited. Moreover, after performing extraction and foaming for an arbitrary (or automatically set) time, the extraction port 58 is opened manually (or automatically) as described above. Accordingly, the tea beverage (medium-quality green tea) in the extraction container 31 is poured into the cup P below from the extraction port 58.

It is to be noted that in the above-described examples, the operation of the discharge device 60 is set, for example, the extraction port 58 is continuously opened, and accordingly continuous extraction is possible regardless of the capacity of the extraction container 31.

(3) Selling of Green Tea Milk

Next, to sell green tea milk, the cup P is set to the tea supply position below the right extraction container 31, and the vending button 25 is operated. The foam milk nozzle 43 is rotated, and opened above the cup P in the tea supply position below the right extraction container 31.

Based on data concerning the vending button 25 set in the memory M, the microcomputer 66 controls the take-out valve 82 and the right hot water supply valve 29 of the hot water tank unit 8 to supply the low-temperature hot water from the low-temperature tank 72 into the extraction container 31, and controls the crushed leaf tea conveying device 28A of the right crushed leaf tea canister 28 to supply a small amount of crushed leaf tea into the extraction container 31 from the crushed leaf tea canister 28. In this case, the right stirring speed adjustment knob 18 is operated to control rotation number of the stirring motor 17M, and a tea extracted liquid in the extraction container 31 may be stirred by the stirring vane 17. Moreover, after performing the stirring for an arbitrary time, the lever 47 is rotated by about 30 degrees counterclockwise as viewed from above, and the extracted liquid in the extraction container 31 is poured into the cup P below from the extraction port 58.

On the other hand, the microcomputer 66 produces a predetermined amount of foam milk by the foam milk producing unit 41, and supplies the milk in the cup P from the foam milk nozzle 43. Moreover, the supplied foam milk and tea extracted liquid are mixed in the cup P to thereby manufacture green tea milk. In this case, it can be selected whether or not to pour the milk foam into the extraction container 31 prior to the tea beverage, simultaneously pour them, or pour the milk foam later. When the milk foam is first poured, so-called "latte" is produced. When the milk foam is poured later, "au lait" is produced.

(4) Selling of Coffee

Next, to sell coffee, the shower nozzle 108 is attached to the hot water supply port 44 of the left attachment frame 32. The stirring vane 17 for coffee is also attached to the stirring motor 17M. Moreover, the dripper 98 and a paper filter (not shown) are disposed in the left extraction container 31 as shown in FIG. 18, and a predetermined amount coffee material powder is projected. Moreover, the extraction container 31 is set to the left attachment frame 32, the cup P is set to the tea supply position under the extraction container 31, and the vending button 21 is operated.

The microcomputer 66 controls the take-out valve 81 of the hot water tank unit 8 and the left hot water supply valve 29 based on data concerning the vending button 21 set in the memory M to thereby supply the high-temperature hot water into the extraction container 31 from the high-temperature tank 71. Since the hot water is uniformly scattered onto coffee material powder in the dripper 98 from the shower nozzle 108, a coffee liquid is smoothly extracted from the material powder. Even during this extraction, the microcomputer 66 rotates the stirring vane 17 at a speed suitable for the coffee by the stirring motor 17M (set by the knob 18).

At this time, when the extraction port 58 is opened beforehand as shown in FIG. 18, the extracted coffee is gradually poured into the cup P below. On the other hand, when the extraction port 58 is closed, extraction is performed in a state in which the hot water and material powder are stored in the dripper 98, so-called drip on extraction is performed. When this drip-on is performed, stronger coffee can be extracted. In this case, after the extraction for a predetermined time, the extraction port 58 is opened, and strong coffee is poured into the cup P.

Thus, since the crushed leaf tea is used in the present invention, sufficient tea beverage can be constantly extracted with a necessary amount in a short time constantly with a certain taste as compared with the extraction from the leaf tea as in the conventional case, or can be extracted into an arbitrary taste. Consequently, even when the tea beverage is extracted every serve, and freshly extracted beverage is provided, the beverage can be provided without keeping the user waiting. As a result, waste tea leaves do not have to be discarded.

Moreover, since the supply of the crushed leaf tea and hot water to the extraction container 31 can be controlled based on the arbitrary setting, the amounts of the crushed leaf tea and hot water for use in the extraction of the tea beverage in the extraction container 31 can be arbitrarily set. Consequently, it is possible to extract tea beverage such as powdered green tea and medium-quality green tea having taste, aroma, and flavor which suit user's (server or utilizer) palate easily with a stable quality.

Especially, the dripper 98 and paper filter for extracting the coffee can be disposed in the extraction container 31, and the high-temperature hot water only can be supplied to the extraction container 31 from the hot water tank unit 8 via the hot water supply port 44. Therefore, the dripper 98 and the paper filter are disposed in the extraction container 31, the coffee material powder is projected, the hot water is supplied, and accordingly it is possible to extract the coffee by the extraction container 31. Accordingly, the extraction of the coffee in addition to the tea beverage can be performed, and versatility and convenience are superior.

It is to be noted that the take-out valves 81, 82 are disposed in each of the tanks 71, 72, the hot water is supplied to the right/left extraction containers 31, and then the hot water supply valves 29, 29 are not required. Even when channel swichable valves such as three-way valves are used in the take-out valves 81, 82, it is possible to omit the hot water supply valves 29, 29.

As described above, the beverage manufacturing apparatus of the present invention comprises: crushing means for crushing leaf tea to produce crushed leaf tea; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting. Therefore, since the crushed leaf tea is used, sufficient tea beverage can be extracted in a short time as compared with a case where the beverage is extracted from the leaf tea itself such as in the conventional technique. Consequently, even when the tea beverage is extracted every serve, and freshly extracted beverage is served, the beverage can be supplied without keeping the utilizer waiting. The control means controls the supply of the crushed leaf tea and hot water to the extraction means based on arbitrary setting. Therefore, the amounts of the crushed leaf tea and hot water for use in the extraction of the tea beverage in the extraction means can be arbitrarily set. Consequently, the tea beverage having taste, aroma, and flavor which suit server's or utilizer's palate can be extracted easily with a stable quality.

Especially, in this case, the extraction means can be charged with a dripper and a paper filter for coffee extraction, and the control means is capable of supplying the only hot water from the hot water supply means to the extraction means from a hot water supply port. Therefore, when the dripper and paper filter are disposed in the extraction means, the coffee material powder is projected, and the hot water is supplied, it is possible to extract coffee by the extraction means. Consequently, the extraction of the coffee in addition to the tea beverage can be performed, and versatility and convenience are superior.

Moreover, in the present invention, since a shower head is attachable to the hot water supply port, the hot water is uniformly scattered over the coffee material powder in the dripper, and it is possible to extract coffee having rich aroma and flavor.

Furthermore, in the present invention, the extraction means additionally comprises a discharge mechanism which discharges the beverage in the extraction means by a predetermined operation. Therefore, when the discharge mechanism is closed beforehand during the extraction of the coffee, the coffee is extracted in a state in which the hot water is pooled in the dripper, so-called drip-on is possible.

Additionally, in the present invention, the apparatus further comprises discharge means for discharging the beverage in the extraction means, and the control means controls the discharge of the beverage from the extraction means by the discharge means. Therefore, a total process from the extraction to the discharge of the coffee including the drip-on can be automated.

Moreover, in the present invention, the apparatus additionally comprises stirring means for stirring the beverage extracted by the extraction means, and the stirring means is changeably disposed. Therefore, by the use of the stirring means capable of stirring in the dripper, the coffee in the dripper is forcibly stirred to promote the extraction, and quick extraction can be performed.

Furthermore, in the present invention, additionally the control means controls a stirring speed of the stirring means based on arbitrary setting. Therefore, the stirring can be performed at a speed optimum for the extraction of coffee.

Additionally, in the present invention, additionally the extraction means is detachably attached. Therefore, the cleaning in the extraction means, the charging·changing of the dropper·paper filter and the like can be facilitated. Especially, the control means comprises means for detecting attachment of the extraction means, and prohibits a supply operation and/or a stirring operation in a case where the extraction means is not attached. Therefore, a disadvantage that the supply of the hot water and the operation of the stirring means are performed by mistake in a state in which any extraction means is not attached can be avoided in advance.

Moreover, a beverage manufacturing apparatus of the present invention comprises: crushing means for crushing leaf tea to produce crushed leaf tea; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting. Therefore, since the crushed leaf tea is used, sufficient tea beverage can be extracted in a short time as compared with a case where the beverage is extracted from the leaf tea itself as in the conventional technique. Consequently, even when the tea beverage is extracted every serve, and freshly extracted beverage is served, the beverage can be supplied without keeping the utilizer waiting. The control means controls the supply of the crushed leaf tea and hot water to the extraction means based on arbitrary setting. Therefore, the amounts of the crushed leaf tea and hot water for use in the extraction of the tea beverage in the extraction means can be arbitrarily set. Consequently, the tea beverage having taste, aroma, and flavor which suit server's or utilizer's palate can be extracted easily with a stable quality.

Especially, in this case, since the extraction means is detachably attached, the cleaning·changing and the like in the extraction means can be easily performed. Especially, the control means comprises means for detecting attachment of the extraction means, and prohibiting a supply operation in a case where the extraction means is not attached. Therefore, a disadvantage that the hot water and crushed leaf tea are supplied by mistake in a case where the extraction means is not extracted can be avoided in advance.

Furthermore, according to the present invention, a beverage manufacturing apparatus comprises: crushing means for crushing leaf tea to produce crushed leaf tea; hot water supply means for producing hot water; extraction means for extracting tea beverage using the crushed leaf tea and the hot water; and control means for controlling supply of the crushed leaf tea from the crushing means to the extraction means, supply of the hot water from the hot water supply means to the extraction means, and the stirring means based on arbitrary setting. Therefore, since the crushed leaf tea is used, sufficient tea beverage can be extracted in a short time as compared with a case where the beverage is extracted from the leaf tea itself as in the conventional technique. Consequently, even when the tea beverage is extracted every serve, and freshly extracted beverage is served, the beverage can be supplied without keeping the utilizer waiting. The control means controls the supply of the crushed leaf tea and hot water to the extraction means based on arbitrary setting. Therefore, the amounts of the crushed leaf tea and hot water for use in the extraction of the tea beverage in the extraction means can be arbitrarily set. Consequently, the tea beverage having taste, aroma, and flavor which suit server's or utilizer's palate can be extracted easily with a stable quality.

Especially in this case, the apparatus comprises discharge means for discharging the beverage in the extraction means, and stirring means for stirring the beverage extracted in the extraction means. The control means is capable of intermittently operating the stirring means, and the extraction means is attachable to a predetermined resistance imparting member. Therefore, when the beverage is stirred by the stirring means in a state in which the discharge means is opened, well foaming tea beverage can be extracted. This foaming is further satisfactory, when the resistance imparting member is attached. On the other hand, by the stirring in a state in which the discharge means is closed, little foaming tea beverage can be extracted.

Additionally, a beverage manufacturing apparatus of the present invention comprises: crushing means for crushing leaf tea to produce crushed leaf tea; leaf tea containing means for containing the leaf tea crushed by the crushing means; hot water supply means for producing hot water; extraction means for extracting tea beverage using the crushed leaf tea and the hot water; and control means for controlling supply of the crushed leaf tea from the crushing means to the extraction means and supply of the hot water from the hot water supply means to the extraction means based on arbitrary setting. Therefore, since the crushed leaf tea is used, sufficient tea beverage can be extracted in a short time as compared with a case where the beverage is extracted from the leaf tea itself as in the conventional technique. Consequently, even when the tea beverage is extracted every serve, and freshly extracted beverage is served, the beverage can be supplied without keeping the utilizer waiting. The control means controls the supply of the crushed leaf tea and hot water to the extraction means based on arbitrary setting. Therefore, the amounts of the crushed leaf tea and hot water for use in the extraction of the tea beverage in the extraction means can be arbitrarily set. Consequently, the tea beverage having taste, aroma, and flavor which suit server's or utilizer's palate can be extracted easily with a stable quality.

Especially, in this case, a holding portion which detachably holds a dehumidifying agent or a drying agent is disposed in the leaf tea containing means. Therefore, it is possible to prevent deterioration of the leaf tea in the leaf tea containing means by humidity, and to realize extraction of good tea beverage. The changing or charging of the dehumidifying or drying agent is also facilitated.

Moreover, in the present invention, additionally the hot water supply means comprises high-temperature water producing means for producing high-temperature hot water, and low-temperature water producing means for producing comparatively low temperature hot water, and the control means supplies the hot water to the extraction means from the high-temperature water producing means or the low-temperature water producing means based on the arbitrary setting. Therefore, the high or low temperature of the hot water can be selected in accordance with the tea beverage to be extracted. The high-quality extraction can be realized with the hot water at the temperature suitable for the type of the tea beverage.

Especially, the hot water once set at high temperature is cooled and supplied to the low-temperature water producing means by the high-temperature water producing means. Accordingly, so-called cooled hot water is used as the low-temperature hot water. Even during the extraction with the low-temperature hot water, the extraction of good tea beverage with suppressed chlorine smell can be realized.

Furthermore, the apparatus comprises a communication tube which supplies the hot water to the low-temperature water producing means from the high-temperature water producing means, and the communication tube is wound in a coil shape. Accordingly, the hot water supplied to the low-temperature water producing means from the high-temperature water producing means can satisfactorily release heat in the communication tube.

Additionally, when a fan for passing air through the communication tube is disposed, the hot water flowing inside the communication tube can be forcibly air-cooled.

Moreover, the apparatus comprises a temperature sensor which detects the temperature of the communication tube, and the control means operates a fan in a case where the temperature of the communication tube reaches a predetermined temperature or more. Then, the fan is operated to thereby forcibly air-cool the beverage only when necessary, and this can contribute to energy saving.

Furthermore, the communication tube is disposed in a duct, and the air is passed through the duct by the fan. Consequently, the air can be more effectively passed through the communication tube utilizing a funnel effect.

Additionally, when a wind direction inhibiting member is disposed in a center portion of a coil of the communication tube, the air passed in the duct can be passed in the vicinity of the communication tube, and an air cooling effect is further enhanced.

Moreover, when heat is exchanged between a water supply tube and the communication tube with respect to the hot water supply means, the hot water flowing in the communication tube can be cooled by low-temperature city water flowing in the water supply tube, and a cooling ability is further enhanced.

What is claimed is:

1. A beverage manufacturing apparatus comprising leaf tea containing means for containing leaf tea to be crushed; the leaf tea containing means comprising a lid and a holding portion mounted to the lid which detachably holds a dehumidifying agent or a drying agent; crushing means positioned below the leaf tea containing means to receive leaf tea from the leaf tea containing means, for crushing leaf tea to produce crushed leaf tea; hot water supply means for producing hot water; extraction means positioned below the crushing means to receive crushed leaf tea from the crushing means and hot water from the hot water supply means for extracting tea beverage using the crushed leaf tea and the hot water; and control means for controlling supply of the crushed tea leaf from the crushing means to the extraction means and supply of the hot water from the hot water supply means to the extraction means based on arbitrary setting.

2. A beverage manufacturing apparatus comprising: crushing means for crushing leaf tea to produce crushed leaf tea; hot water supply means for producing hot water; extraction means for extracting tea beverage using the crushed leaf tea and the hot water; and control means for controlling supply of the crushed tea leaf from the crushing means to the extraction means and supply of the hot water from the hot water supply means to the extraction means based on arbitrary setting, the extraction means being capable of being charged with a dripper and a paper filter, the control means being capable of supplying the only hot water from the hot water supply means to the extraction means from a hot water supply port, wherein the hot water supply means comprises high-temperature water producing means for producing high-temperature hot water, and low-temperature water producing means for producing comparatively low temperature hot water, and the control means supplies the hot water to the extraction means from the high-temperature water producing means or the low-temperature water producing means based on the arbitrary setting, wherein the hot water once set at high temperature is cooled and supplied to the low-temperature water producing means by the high-temperature water producing means, and further comprising: a communication tube which supplies the hot water to the low-temperature water producing means from the high-temperature water producing means, the communication tube being wound in a coil shape.

3. The beverage manufacturing apparatus according to claim 2, further comprising: a fan which passes air through the communication tube.

4. The beverage manufacturing apparatus according to claim 3, further comprising: a temperature sensor which detects the temperature of the communication tube, wherein the control means operates a fan in a case where the temperature of the communication tube reaches a predetermined temperature or more.

5. The beverage manufacturing apparatus according to claim 3, wherein the communication tube is disposed in a duct, and the air is passed through the duct by the fan.

6. The beverage manufacturing apparatus according to claim 5, further comprising: a wind direction inhibiting member disposed in a center portion of a coil of the communication tube.

7. The beverage manufacturing apparatus according to claim 2, wherein heat is exchanged between a water supply tube and the communication tube with respect to the hot water supply means.

* * * * *